US012173174B2

(12) United States Patent
Lohmeijer et al.

(10) Patent No.: US 12,173,174 B2
(45) Date of Patent: Dec. 24, 2024

(54) PROCESS FOR PRODUCING AN AQUEOUS POLYMER DISPERSION

(71) Applicant: BASF SE, Ludwigshafen am Rhein (DE)

(72) Inventors: Bastiaan Lohmeijer, Ludwigshafen am Rhein (DE); Roelof Balk, Ludwigshafen am Rhein (DE); Robert Wrazidlo, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 863 days.

(21) Appl. No.: 17/265,224

(22) PCT Filed: Jul. 22, 2019

(86) PCT No.: PCT/EP2019/069677
§ 371 (c)(1),
(2) Date: Feb. 2, 2021

(87) PCT Pub. No.: WO2020/025383
PCT Pub. Date: Feb. 6, 2020

(65) Prior Publication Data
US 2022/0325125 A1 Oct. 13, 2022

(30) Foreign Application Priority Data
Aug. 2, 2018 (EP) ..................... 18186974

(51) Int. Cl.
C08F 2/22 (2006.01)
C09D 5/02 (2006.01)
C09D 5/22 (2006.01)
C09D 125/14 (2006.01)
C09D 133/12 (2006.01)

(52) U.S. Cl.
CPC .............. C09D 133/12 (2013.01); C08F 2/22 (2013.01); C09D 5/022 (2013.01); C09D 125/14 (2013.01)

(58) Field of Classification Search
CPC .......... C08F 2/22; C09D 5/022; C09D 125/14
USPC ........................................... 524/460
See application file for complete search history.

(56) References Cited

U.S. PATENT DOCUMENTS

| 4,079,028 A | 3/1978 | Emmons et al. |
| 4,155,892 A | 5/1979 | Emmons et al. |
| 4,269,749 A | 5/1981 | Marriott et al. |
| 5,401,582 A | 3/1995 | Weyland et al. |
| 5,726,259 A | 3/1998 | Hayes et al. |
| 6,096,858 A | 8/2000 | Dobbelaar et al. |
| 6,992,121 B1* | 1/2006 | Peters ................... C08F 285/00 524/833 |
| 2011/0166291 A1 | 7/2011 | Tuerk et al. |
| 2012/0252972 A1 | 10/2012 | Balk et al. |

FOREIGN PATENT DOCUMENTS

| DE | 4003422 A1 | 8/1991 |
| DE | 4137247 A1 | 5/1993 |
| DE | 19624299 A1 | 1/1997 |
| DE | 19621027 A1 | 11/1997 |
| DE | 19741184 A1 | 3/1999 |
| DE | 19741187 A1 | 3/1999 |
| DE | 19805122 A1 | 4/1999 |
| DE | 19828183 A1 | 12/1999 |
| DE | 19839199 A1 | 3/2000 |
| DE | 19840586 A1 | 3/2000 |
| DE | 19847115 C1 | 5/2000 |
| DE | 102004008015 A1 | 9/2005 |
| DE | 102004031786 A1 | 1/2006 |
| EP | 0061822 A1 | 10/1982 |
| EP | 0081083 A2 | 6/1983 |
| EP | 0307775 A2 | 3/1989 |
| EP | 0568834 A1 | 11/1993 |
| EP | 0612329 A1 | 8/1994 |
| EP | 0771328 A1 | 5/1997 |
| EP | 1013264 A1 | 6/2000 |
| EP | 1302515 A2 | 4/2003 |
| EP | 1541643 A1 | 6/2005 |
| EP | 1584331 A1 | 10/2005 |
| EP | 2184304 A1 | 5/2010 |
| WO | 93/10166 | 5/1993 |
| WO | 95/33775 A1 | 12/1995 |
| WO | 96/31550 A1 | 10/1996 |
| WO | 01/38412 A1 | 5/2001 |

(Continued)

OTHER PUBLICATIONS

International Preliminary Report on Patentability received for PCT Patent Application No. PCT/EP2019/069677, mailed on Feb. 11, 2021, 7 pages.

(Continued)

Primary Examiner — Kelechi C Egwim
(74) Attorney, Agent, or Firm — Faegre Drinker Biddle & Reath LLP

(57) ABSTRACT

The present invention relates to a process for producing an aqueous polymer dispersion of polymerized ethylenically unsaturated monomers M having a polymer content of at least 55 wt. % and a polymodal particle size distribution of the polymer particles of the polymer dispersion. The invention also relates to aqueous polymer dispersions obtained from this process as well as aqueous liquid compositions comprising at least one aqueous polymer dispersion and the use of such aqueous liquid compositions as binder.

11 Claims, 2 Drawing Sheets

(56) References Cited

FOREIGN PATENT DOCUMENTS

Figure 1:
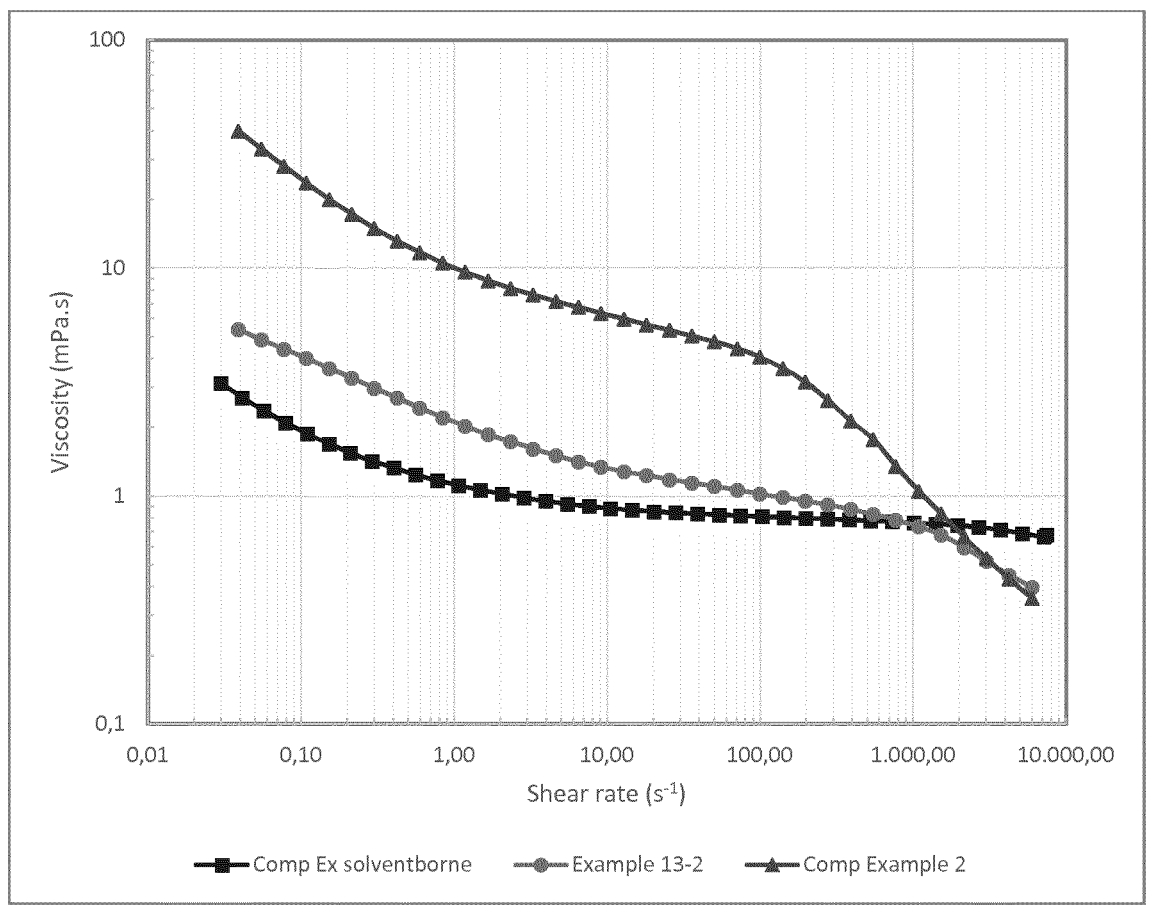

| WO | 2004/101639 A1 | 11/2004 |
| WO | 2009/127620 A1 | 10/2009 |
| WO | 2012/052508 A2 | 4/2012 |
| WO | 2016/042116 A2 | 3/2016 |
| WO | 2017/157934 A1 | 9/2017 |

OTHER PUBLICATIONS

International Search Report and Written Opinion received for PCT Patent Application No. PCT/EP2019/069677, mailed on Oct. 7, 2019, 9 pages.

Mariz, et al., "High performance water-borne paints with high volume solids based on bimodal latexes", Progress in Organic Coatings, vol. 68, Issue 3, Jul. 2010, pp. 225-233.

Richard R. Eley, et al., "Applied rheology in the protective and Decorative coatings industry", Rheology Reviews, 2005, pp. 173-240.

Schuler, et al., "Structure and properties of multiphase particles and their impact on the performance of architectural coatings", Progress in Organic Coatings, vol. 40, Issue 1-4, Dec. 2000, pp. 139-150.

T. G. Fox, "Influence of Diluent and of Copolymer Composition on the Glass Temperature of a Polymer System", Bulletin of the American Physical Society, vol. 1, 1956, p. 123.

\* cited by examiner

PROCESS FOR PRODUCING AN AQUEOUS POLYMER DISPERSION

CROSS-REFERENCE TO RELATED APPLICATIONS

This application is a national stage application (under 35 U.S.C. § 371) of PCT/EP2019/069677, filed Jul. 22, 2019, which claims benefit of European Application No. 18186974.4, filed Aug. 2, 2018, both of which are incorporated herein by reference in their entirety.

The present invention relates to a process for producing an aqueous polymer dispersion of polymerized ethylenically unsaturated monomers M having a polymer content of at least 55 wt. % and a polymodal particle size distribution of the polymer particles of the polymer dispersion. The invention also relates to aqueous polymer dispersions obtained from this process as well as aqueous liquid compositions comprising at least one aqueous polymer dispersion and the use of such aqueous liquid compositions as binder compositions in coating compositions for decorative coatings, such as paints and clear coats.

BACKGROUND OF INVENTION

Aqueous polymer dispersions are frequently used as binders in polymer bound coating compositions. High quality coating compositions are often formulated at pigment volume concentrations (PVC) below the critical pigment volume concentration (cPVC). The pigment volume concentration is the mathematical ratio of the volume fraction of pigment and fillers to the total volume of the dried coatings. The critical pigment volume concentration is the PVC at which the polymer binder in the dried coating still completely wets the pigments and fillers contained in the coating composition and fills all of the interstices. Accordingly, if the coating composition is formulated at a PVC below the cPVC, the coating is just coherent and continuous while above the cPVC the binder only provides bridges between the pigment and filler particles and the paint film develops open pores and voids.

One of the very basic properties of coating compositions is the amount that can be applied onto the surface to be coated. It is apparent, that for a coating composition which is formulated below the cPVC, the dry layer thickness is the straightforward result of the solids content and the density of the paint after complete drying, while in a coating composition formulated above the cPVC, the air void volume needs to be considered. The higher the solids content, all else being equal, the higher the dry layer thickness. High dry layer thicknesses have advantages in increased hiding per coating step allowing a reduction in the number of coating steps.

High wet layer thicknesses are a function of the rheology of the paint. A variety of application techniques are available to ensure wet layer thickness (incl. spray application, roll-to-roll, etc. etc.). One of the oldest still-in-use by both DIY- and professional painters are brush and/or roller applications, which are high shear application processes. It is well-understood that increasing the high shear viscosity of the coating composition leads to higher wet layer thicknesses. However high shear viscosities measured at a single shear rate (single point measurements of viscosity like the ICI or CAP or rheometer) are only a crude approximation of the value that the viscosity should have for achieving high wet layer thicknesses. Moreover, every painter has a slightly different way in applying shear forces to spread the coating composition on the surface, making this value less precise for the goal of achieving high wet layer thickness. Rather, single point measurements will give a certain framework or window, in which the majority of people get meaningful paint results. Also here there are upper limits in setting the rheology to obtain a certain wet layer thickness, in terms of paint transfer from the can to the brush, from the brush to the substrate and the spreading of the paint on the substrate, all the while mitigating that classic conundrum between sagging and leveling performance.

Modern solvent-borne coating compositions for decorative coatings, such as clear coats and paints, nowadays have a high content of polymer binder of up to 80 wt.-% or more (see e.g. WO 2004/101639). The high polymer content leads to improved properties such as high dry layer thickness, excellent leveling, good application properties by brush and roller, and high loading of pigments at comparatively low PVC. This enables good hiding, while the soluble nature of the polymer in the medium makes touch-up during or shortly after application straightforward, since brushmarks or roller stipple are smoothly leveled. However, volatile organic compounds (VOC) contained in these compositions are problematic for environmental reasons and for work hygiene. Moreover, the polymer under use is typically of low molecular weight, leading to tackiness of the paint film, and requires crosslinking after physical drying. Most often auto-oxidation is utilized for such crosslinking reactions, yet to get meaningful early mechanical properties environmentally questionable transition metal based catalysts need to be applied.

Modern waterborne coating compositions behave fundamentally different from solvent-borne coating compositions in particular with regard to the film formation process and with regard to the rheology. This is because in waterborne coating compositions the polymer binder is typically present as discrete polymer particles made via emulsion polymerization. Different film formation stages, such as compaction, deformation and interdiffusion, have been identified as crucial for the build-up of desirable mechanical properties of coatings obtained from waterborne coating compositions. Apart from that, the particle-like nature of the binder leads to shear thinning, which means that an undesirable high viscosity level at low shear is normally required to achieve a desirable high level of high shear viscosity. Therefore application properties often do suffer. Striking the correct balance by setting the viscosities at different shear rates or shear stresses relevant to the performance of a coating composition is not straightforward. In R. Eley, Rheology Reviews, 2005, 173-240 correlations between viscosity regimes and paint performance are described and explained. Finding such correlations and causalities was and remains an active area of research.

Rheology modifiers, also known as thickeners, are extensively used in waterborne coatings and they are classified in how they affect the low, mid and high shear viscosity regions. It is however rarely possibly to strictly affect the one viscosity region without having an effect on other viscosity regions. For example, a low shear thickener increases the viscosity in the low shear region, but also in the mid shear region. Using combinations of aforementioned thickeners typically leads to a compromise between application properties, such as wet layer thickness, sagging, leveling and paint transfer. Other additives, including coalescents, may help in shifting the balance to a better compromise depending on requirements. Achieving a Newtonian rheology profile is virtually impossible using a polymer latex as a binder at meaningful paint solids content. Moreover, polymer latexes for paint applications have solids contents of 50 wt.-%. The dry layer thickness of a resulting coating is therefore much lower than the wet layer thickness.

Clearly, a waterborne binder that can be formulated at high solids content with an appropriate high level of high shear viscosity and comparatively low level of low- and mid-shear viscosity will be highly desirable to obtain coating compositions with favorable brush and/or roller application properties in terms of high wet layer thickness, ease of spreading and a good balance between sag resistance and leveling.

Nonetheless, waterborne coatings, even at these (much) lower solids contents, tend to dry quick and develop mechanical properties faster than their solvent-borne counterparts, which is positive for finishing a paint job. The molecular weight of the polymer is typically sufficiently high and the glass transition temperature(s) suitably chosen, so that self-crosslinking reactions may not even be necessary. Post film formation crosslinking may be employed though for increasing performance properties such as chemical resistance or dirt pick-up resistance.

It is well-known that further lowering coalescent demand while maintaining sufficiently high hardness and maintaining blocking resistance requires polymer latexes having both hard and soft polymer phases. They can principally be accessed through multistage emulsion polymerization, in which two different monomer feeds of varying 'hard' and 'soft' monomers are consecutively added to the polymerization reactor. Proper control over such a process allows after film formation hard, blocking resistant polymer films with low VOC demand. Even though these techniques are well-established for binders with monomodal particle size distributions, where it is possible to introduce 20 wt.-% to up to 50 wt.-% of a monomer feed of different composition, this is not a straightforward matter for aqueous polymer dispersions with bi- or multimodal particle size distributions, which are principally desirable for achieving high solids contents. So far no measures are known, which allow for reliably producing aqueous polymer dispersions with bi- or multimodal particle size distributions having 'hard' and 'soft' polymer stages, in particular at high polymer solids of 55 wt.-% or higher.

EP 81083 A2 describes a method for preparing aqueous polymer dispersions having high solids content which comprise preparing a first latex and a second latex, mixing the first and the second latex, emulsifying ethylenically unsaturated monomers in the mixture of the first and the second latex and subjection the mixture to polymerization conditions. The method is tedious and does not provide the polymer dispersion in reproducible manner.

EP 0568834 A2 describes aqueous polymer dispersions having a solids volume concentration of at least 50% by volume, which are obtained by a free-radical aqueous emulsion polymerization of ethylenically unsaturated monomers comprising the addition of at least two starting polymer dispersions, one of which having small particles, while the other contains coarse polymer particles.

These aqueous polymer dispersions, however, are not particularly suitable for preparation of low VOC decorative coatings, such as paints and clear coats, as they either require the use of film forming aids or provide only poor coating properties.

U.S. Pat. No. 5,726,259 describes a process for preparing high solid latexes by a complex sequential emulsion polymerization of ethylenically unsaturated monomers comprising the in-situ preparation of a polymer seed followed by a first sequential emulsion polymerization, where the monomers are sequentially fed to the reaction zone at a rate which exceeds the rate of consumption, further followed by the in-situ formation of a second seed latex in the presence of the non-reacted monomers of the first sequential emulsion polymerization further followed by a second sequential emulsion polymerization. The latexes are suggested for use in paper coating processes but are not suitable for decorative coating compositions, such as paints and clear coats.

EP 1302515 describes the use of bimodal polymer dispersions as binders in waterborne paints for improving coating properties, such as blocking resistance, blocking of stains and hiding. The bimodal polymer dispersions are prepared either by mixing two aqueous latexes or by a method, where the pH is altered during polymerization. However, the properties of the polymer latexes are not always satisfactory. Moreover, expensive phosphor containing monomers are required. The solids content of the polymer dispersion is below 55% by weight. The coating compositions contain considerable amounts of film forming aids.

I. de F. A. Mariz et al., Progress in organic coatings 68 (2010) 225-233, describe waterborne paints with high volume solids content based on bimodal latexes. Again, the solids content of the polymer dispersion is below 55% by weight. Moreover, the coating compositions contain considerable amounts of film forming aids.

WO 2017/157934 describes multistage polymer dispersions that show superior film forming properties at lower temperatures in the range of 0 to 40° C. as well as superior mechanical properties of the film obtained from those dispersions. However, expensive monomers and a polyfunctional amine additive is required.

WO 01/38412 describes a process for preparing aqueous polymodal multistage polymer emulsions comprising i) a first aqueous emulsion polymerization stage forming a first stage polymer followed by an introduction of a particle size change means and ii) a second aqueous emulsion polymerization stage forming a second stage polymer, and iii) a third aqueous emulsion polymerization stage in the presence of the first and second stage polymers to form a third stage polymer. While the process allows for preparing high solids polymer dispersion, the polymer dispersions do not provide a desirable rheological behavior to waterborne coating compositions. In particular, the process fails to produce high solids aqueous polymer dispersions, if the monomers to be polymerized contain less than 20% by weight of styrene.

Schuler et al. in Progress in Organic Coatings 2000, 40, 139-150) describe the structure and properties of polymer latex having multiphase particles and their impact on the performance of architectural coatings.

To summarize, the desired high solids polymer dispersions usually require complex and extensive production methods. Moreover, the known emulsion polymerization techniques do not allow for reliably producing high solids aqueous polymer dispersions having the desired rheological properties. In particular, the known emulsion polymerization techniques do not allow for reliably producing high solids aqueous polymer dispersions from monomers containing less than 20% by weight of styrene, based on the total weight of the monomers to be polymerized.

SUMMARY OF INVENTION

It is an object of the present invention to provide a process for reliably producing aqueous polymer dispersions having a high polymer content of at least 55 wt.-%, based on the total weight of the aqueous polymer dispersion, which provide beneficial rheological profile, in particular reduced shear thinning, and which provide good coating properties such as improved gloss and high blocking resistance when used as binders in low VOC coating compositions for decorative coatings. The process should allow the production of high solids aqueous polymer dispersions in an easy and reproducible manner, in particular if monomer compositions are polymerized, which contain less than 20% by weight of styrene or other vinyl aromatic monomers. Besides that, the coatings obtained therefrom should have a good mechanical resistance and resistance against staining.

It was surprisingly found that these objectives can be achieved by the process as described herein.

Consequently, a first aspect of the present invention relates to a process for producing an aqueous polymer dispersion of polymerized ethylenically unsaturated monomers M having a polymer content of at least 55 wt.-%, based on the total weight of the aqueous polymer dispersion, and a polymodal particle size distribution of the polymer particles of the polymer dispersion, where the aqueous polymer dispersion comprises a first population of small polymer particles and a second population of large polymer particles, where the weight ratio of the small polymer particles of the first population to the polymer large particles of the second population of large particles is at most 1:1, where both the polymer particles of the first population and the polymer particles of the second population comprise a first polymer phase A having a glass transition temperature $Tg(A)$ and a second polymer phase B having glass transition temperature $Tg(B)$, where the difference $Tg(B)-Tg(A)$ is at least 10° C., where $Tg(A)$ and $Tg(B)$ are theoretical glass transition temperatures as determined by the Fox equation, where the process comprises aqueous radical emulsion polymerization of ethylenically unsaturated monomers M in the presence of at least one emulsifier, comprising the following steps:

i) aqueous radical emulsion polymerization of a first monomer composition M(1) forming either the polymer phase A or B, and subsequently ii) aqueous radical emulsion polymerization a second monomer composition M(2) forming the other polymer phase A or B, where at least 95% of the first monomer composition M(1) and a portion of the emulsifier E are metered during a period P(1) to the polymerization reaction under polymerization conditions, and where during the period P(1) at least one of the following measures i.1 or i.2 are taken:

i.1 during one period P(e) within said period P(1), an emulsifier E(e) is added, where during said period P(e) the total addition rate of all emulsifiers added during that period P(e) is at least 1.2 times, in particular at least 1.4 times higher than the average rate of addition of all emulsifiers added during the period P(1), and i.2 during one period P(s) within said period P(1), a seed latex is added.

The invention also relates to aqueous polymer dispersions of polymerized ethylenically unsaturated monomers M, which are obtainable by the process as described herein and aqueous liquid compositions comprising at least one aqueous polymer dispersion as described herein as well as the use of such dispersions and/or compositions.

The invention described herein provides several benefits:

The process allows for preparing high solids aqueous polymer dispersions in an easy and reproducible manner without requiring the preparation of separate polymer dispersions.

The polymer dispersions obtainable by the process of the invention have beneficial film forming properties and provide non-tacky and durable coatings when used as binders in coating compositions, such as paints and clear coats, even if the monomers forming the polymer particles comprise less than 20% by weight of styrene or other vinyl aromatic monomers, based on the total amount of polymerized monomers.

The process of the invention provides aqueous polymer dispersions which are stable and have a beneficial rheological profile despite of having a polymer content of more than 55 wt.-%, based on the total weight of the aqueous polymer dispersion, even if the monomers to be polymerized comprise less than 20% by weight of styrene or other vinyl aromatic monomers.

Due to their high polymer content, the polymer dispersions which are obtainable by the process of the invention can be formulated with a higher solids content. As a consequence the high solids content and the beneficial rheological profile of the coating compositions, a high wet layer thickness and thus good hiding is achieved by a single coating step. Moreover drying time can be reduced in comparison to conventional waterborne coating compositions.

If a high solid polymer dispersion which is obtainable by the process of the invention is formulated in waterborne coating compositions with an associative thickener the formulation has a very beneficial rheological profile and in particular low shear thinning, which renders the polymer dispersions obtainable by the process of the invention particularly suitable for waterborne decorative coating compositions. In particular shear thinning can be reduced and a pseudo Newtonian behavior can be achieved.

The polymer dispersions obtainable by the process of the invention having good film forming properties and require less or even no organic solvents or other film forming aids to achieve good coating properties.

DETAILED DESCRIPTION OF INVENTION

Here and throughout the specification, the prefixes $C_n$-$C_m$ used in connection with compounds or molecular moieties each indicate a range for the number of possible carbon atoms that a molecular moiety or a compound can have. The term "$C_1$-$C_n$ alkyl" denominates a group of linear or branched saturated hydrocarbon radicals having from 1 to n carbon atoms. For example, the term $C_1$-$C_{20}$ alkyl denominates a group of linear or branched saturated hydrocarbon radicals having from 1 to 20 carbon atoms, while the term $C_1$-$C_4$ alkyl denominates a group of linear or branched saturated hydrocarbon radicals having from 1 to 4 carbon atoms. Examples of alkyl include but are not limited to methyl, ethyl, n-propyl, isopropyl, n-butyl, sec-butyl, isobutyl, tert-butyl, 2-methylpropyl (isopropyl), 1,1-dimethylethyl (tert.-butyl), pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, heptyl, octyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl docosyl and their isomers. Examples of $C_1$-$C_4$-alkyl are for example methyl, ethyl, propyl, 1-methylethyl, butyl, 1-methylpropyl, 2-methylpropyl or 1,1-dimethylethyl.

The term "polymerization conditions" is generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

Here and throughout the specification, the term "pphm" (parts per hundred monomers) is used as a synonym for the relative amount of a certain monomer to the total amount of monomer in % by weight. For example, x pphm monomer M2 means x % by weight of monomers M2, based on the total amount of monomers. In the context of a stage, the value pphm refers to the relative amount or level of a specific monomer with regard to the total amount of the monomers added at said stage. For example, x pphm monomer M2 in a stage means that the relative amount or level of said monomer M2 in said stage is x % by weight, based on the total amount of monomers added in said stage. An increase of y pphm means that the level of a specific monomer is increased by y % by weight from a first level of m % by weight to a second level of m+y % by weight.

Here and throughout the specification, the term "(meth) acryl" includes both acryl and methacryl groups. Hence the term "(meth)acrylate" includes acrylate and methacrylate and the term "(meth)acrylamide" includes acrylamide and met hacrylamide.

Here and throughout the specification, the term "decorative coating composition" is understood to mean a coating composition for decorative purposes of a surface, such as a paint or a clear coating composition. A paint in contrast to a clear coat contains at least one particulate material selected from pigments and fillers.

The term "waterborne" in the context of a composition means a liquid aqueous composition containing water as the continuous phase in an amount sufficient to achieve flowability.

The term "small mode particles" is used synonymously for the term "population of small particles". Likewise, the term "large mode particles" is used synonymously for the term "population of large particles".

The terms "wt.-%" and "% by weight" are used synonymously.

If not stated otherwise, the particle size and the distribution of particle size of the polymer particles is usually determined by analytical ultracentrifuge (AUC) as described hereinafter.

The aqueous polymer dispersions obtainable by the process according to the present invention comprise a first population of small polymer particles, hereinafter also briefly termed "small mode polymer particles" and a second population of large polymer particles, hereinafter briefly termed "large mode polymer particles" as described herein. Both the small mode polymer particles and the large mode polymer particles comprise a first polymer phase A having a glass transition temperature Tg(A) and a second polymer phase B having glass transition temperature Tg(B). According to the invention, the difference of said glass transition temperatures, thus difference "Tg(B)–Tg(A)", is at least 10° C.

Preferably, the difference Tg(B)–Tg(A) is at least 20° C., for example in the range of 20 to 150° C., and more preferably at least 40° C., for example in the range of 40 to 150° C.

The glass transition temperatures as referred to herein are theoretical glass temperatures as calculated from the monomers used for producing the polymer phases A and B, respectively. However, it is also possible to determine the actual glass transition temperatures of the polymer phases A and B of the polymer particles by using known methods for measuring the glass transition temperatures such as differential scanning calorimetry (DSC) or dynamic mechanical methods.

Usually, the theoretical glass transition temperatures and the actual glass transition temperatures are similar and do not deviate from each other by more than 5 K.

The theoretical glass transition temperatures are usually calculated from the monomer composition by the Fox equation:

$$1/Tg = x_1/Tg_1 + x_2/Tg_2 + x_n/Tg_n,$$

In this equation $x_1, x_2, \ldots x_n$ are the mass fractions of the monomers $1, 2, \ldots n$ and $Tg_1, Tg_2, \ldots Tg_n$ are the glass transition temperatures in Kelvin of the homopolymers synthesized from only one of the monomers $1, 2, \ldots n$ at a time. The Fox equation is described by T. G. Fox in Bull. Am. Phys. Soc. 1956, 1, page 123 and as well as in Ullmann's Encyclopadie der technischen Chemie [Ullmann's Encyclopedia of Industrial Chemistry], vol. 19, p. 18, 4th ed., Verlag Chemie, Weinheim, 1980. The Tg values for the homopolymers of most monomers are known and listed, for example, in Ullmann's Encyclopadie der technischen Chemie [Ullmann's Encyclopedia of Industrial Chemistry], 5th ed., vol. A21, p. 169, Verlag Chemie, Weinheim, 1992. Further sources of glass transition temperatures of homopolymers are, for example, J. Brandrup, E. H. Immergut, Polymer Handbook, 1st Ed., J. Wiley, New York 1966, 2nd Ed. J. Wiley, New York 1975, 3rd Ed. J. Wiley, New York 1989 and 4th Ed. J. Wiley, New York 2004.

The (theoretical) glass transition temperature of the polymer phases A and B can by adjusted by choosing proper monomers M1, M2 Mn and their mass fractions $x_1, x_2, \ldots x_n$ in the monomer composition so to arrive at the desired glass transition temperature Tg(A) and Tg(B), respectively. It is common knowledge for a skilled person to choose the proper amounts of monomers M1, M2 Mn for obtaining a copolymer and/or copolymer phase with the desired glass transition temperature.

The actual glass transition temperatures are usually determined experimentally by the differential scanning calorimetry (DSC) method according to ISO 11357-2:2013, preferably with sample preparation according to ISO 16805:2003. Usually, the theoretical glass temperature calculated according to Fox as described herein and the experimentally determined glass transition temperature as described herein are similar or even same and do not deviate from each other by more than 5 K, in particular they deviate not more than 2 K.

The monomer composition forming the polymer phase A is chosen such that the theoretical glass transition temperature Tg(A) is frequently in the range of –30 to +60° C., preferably in the range of –20 to 50° C. and especially in the range from –10 to 30° C. Likewise, the monomer composition forming the polymer phase B is chosen such that the theoretical glass transition temperature Tg(B) is preferably in the range of +30 to +160° C., more preferably in the range of 40 to 130° C. and especially in the range from 50 to 120° C. In any case, the difference Tg(B)–Tg(A) is at least 10° C.

In particular, the monomer composition forming the polymer phases A and B, respectively are chosen such that the glass transition temperature Tg(A) is in the range of –40 to +60° C. and the glass transition temperature Tg(B) is in the range of +30 to +160° C., provided that Tg(B)–Tg(A) is at least 10° C., in particular at least 20° C., especially at least 40° C.

In particular, the relative amount of monomers forming the polymer phase A and the monomers forming the polymer phase B are chosen such that the monomers M which are polymerized in the process of the present invention comprise 50 to 95 wt.-%, preferably 60 to 90 wt.-%, based on the total amount of the monomers M, of monomers forming the polymer phase having the lower glass transition temperature Tg(A) and 5 to 50 wt.-%, preferably 10 to 40 wt.-%, based on the total amount of the monomers M, of monomers forming the polymer phase having the higher glass transition temperature Tg(B).

Consequently, the polymer particles contained in the polymer dispersion obtainable by the process according to the present invention comprise 50 to 95 wt.-%, preferably 60 to 90 wt.-%, based on the total weight of the polymer particles, of the polymer phase having the lower glass transition temperature Tg(A) and 5 to 50 wt.-%, preferably 10 to 40 wt.-%, based on the total weight of the polymer particles, of the polymer phase having the higher glass transition temperature Tg(B).

Usually, the ethylenically unsaturated monomers M polymerized in the process of the invention comprise a) at least one nonionic monoethylenically unsaturated monomer M1 having a solubility in deionized water of at most 60 g/L at 25° C. and 1 bar, b) at least one monoethylenically unsaturated monomer M2 selected from acidic monomers and their salts.

Preferably, the monomers M1 are selected from the group consisting of $C_1$-$C_{20}$-alkyl esters of acrylic acid, $C_1$-$C_{20}$-alkylesters of methacrylic acid, and vinyl aromatic monomers.

Suitable $C_1$-$C_{20}$-alkyl esters of acrylic acid include but are not limited to methyl acrylate, ethyl acrylate, n propyl acrylate, isopropyl acrylate, n-butyl acrylate, sec-butyl acrylate, isobutyl acrylate, tert-butyl acrylate, n-pentyl acrylate, n-hexyl acrylate, n-octyl acrylate, 2-ethylhexyl acrylate, n-decyl acrylate, 2-propylheptyl acrylate, lauryl acrylate, C12/C14-alkyl acrylate, and stearyl acrylate.

Suitable $C_1$-$C_{20}$-alkyl esters of methacrylic acid include but are not limited to $C_1$-$C_{20}$-alkyl esters of methacrylic acid, such as methyl methacrylate, ethyl methacrylate, n-propyl methacrylate, isopropyl methacrylate, n-butyl methacrylate, sec-butyl methacrylate, isobutyl methacrylate and tert-butyl methacrylate; and $C_5$-$C_{20}$-alkylesters of methacrylic acid, such as n-pentyl methacrylate, n-hexyl methacrylate, n-octyl methacrylate, 2-ethylhexyl methacrylate, n-decyl methacrylate, 2-propylheptyl methacrylate, lauryl methacrylate, $C_{12}$/$C_{14}$-alkyl methacrylate, and stearyl methacrylate;

and mixtures thereof.

Suitable vinyl aromatic monomers include but are not limited to mono-vinyl substituted aromatic hydrocarbons such as styrene, 2-methylstyrene, 4-methylstyrene, 2-n-butylstyrene, 4-n-butylstyrene, 4-n-decylstyrene and α-methylstyrene, with particular preference given to styrene.

In a preferred group of embodiments, the monomers M and likewise the monomers M1 comprise less than 20% wt.-%, preferably less than 10 wt.-%, in particular less than 5 wt.-% of vinyl aromatic monomers such as in particular mono-vinyl substituted aromatic hydrocarbons. More preferably, the monomers M comprise essentially no vinyl aromatic monomers, where "essentially no vinyl aromatic monomers" means preferably less than 2 wt.-%, more preferably less than 1 wt.-%, more preferably less than 0.5 wt.-%, more preferably less than 0.1 wt.-%, based on the monomers M, of vinyl aromatic monomers.

Preferably, monomers M1 are selected from the group consisting of $C_2$-$C_{10}$-alkyl esters of acrylic acid, in particular ethyl acrylate, n-butyl acrylate, tert-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexylacrylate or mixtures of n-butyl acrylate and ethyl acrylate or mixtures of ethyl acrylate, n-butyl acrylate, tert-butyl acrylate and 2-ethylhexyl acrylate;

$C_1$-$C_4$-alkyl esters of methacrylic acid, in particular methyl methacrylate;

vinyl aromatic monomers, in particular mono-vinyl substituted aromatic hydrocarbons, especially styrene;

in particular mixtures thereof, where these monomers M1 preferably comprise less than 20%, in particular not more than 10% by weight, especially not more than 10% by weight, based on the total amount of monomers M, of vinyl aromatic monomers. In particular, the monomers M1 do not contain vinyl aromatic monomers at all.

In particular, the monomers M1 are a mixture of at least one monomer Mia, selected from $C_1$-$C_{20}$-alkyl esters of acrylic acid and $C_5$-$C_{20}$-alkylesters of methacrylic acid and mixtures thereof; and at least one monomer M1b, selected from $C_1$-$C_4$-alkyl esters of methacrylic acid and mixtures thereof.

More particularly, the monomers M1 are a mixture of at least one monomer Mia, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and at least one monomer M1b, selected from vinyl aromatic monomers, and $C_1$-$C_4$-alkyl esters of methacrylic acid and mixtures thereof where these monomers M1 preferably comprise less than 20%, in particular not more than 10% by weight, especially not more than 10% by weight, based on the total amount of monomers M, of vinyl aromatic monomers. In particular, the monomers M1 do not contain vinyl aromatic monomers at all.

Especially, the monomers M1 are a mixture of at least one monomer M1a, selected from $C_2$-$C_{10}$-alkyl esters of acrylic acid; and at least one monomer M1b, selected from styrene and methyl methacrylate and mixtures thereof.

In a preferred embodiment, the monomers M1 are preferably selected from the group consisting of $C_2$-$C_{10}$-alkyl esters of acrylic acid, in particular ethyl acrylate, n-butyl acrylate, n-hexyl acrylate, n-octyl acrylate, 2-ethylhexyl acrylate, 2-propylheptyl acrylate and mixtures thereof, such as for example mixtures of n-butyl acrylate and 2-ethylhexylacrylate or mixtures of n-butyl acrylate and ethyl acrylate or mixtures of ethyl acrylate, n-butyl acrylate and 2-ethylhexyl acrylate;

$C_1$-$C_4$-alkyl esters of methacrylic acid, in particular methyl methacrylate;

in particular mixtures thereof.

In particular, the monomers M1 are a mixture of
at least one monomer M1a, selected from $C_1$-$C_{20}$-alkyl esters of acrylic acid and $C_5$-$C_{20}$-alkylesters of methacrylic acid and mixtures thereof; and
at least one monomer M1b, selected from $C_1$-$C_4$-alkyl esters of methacrylic acid and mixtures thereof.

More particularly, the monomers M1 are a mixture of
at least one monomer M1a, selected from $C_2$-$C_{10}$-alkyl esters of acrylic acid, in particular from ethyl acrylate, n-butyl acrylate, n-hexyl acrylate, n-octyl acrylate, 2-ethylhexyl acrylate, 2-propylheptyl acrylate and mixtures thereof; and
at least one monomer M1b, selected from $C_1$-$C_4$-alkyl esters of methacrylic acid and mixtures thereof.

In the mixtures of monomers M1a and M1b, the relative amount of M1a and M1b may vary in particular from 10:1 to 1:10, more particularly from 5:1 to 1:5, especially from 3:1 to 1:3. The ratio of monomers M1a to M1b will affect the glass transition temperature and a proper mixture will result in the desired glass transition temperature Tg(a) or Tg(b) respectively.

The total amount of monomers M1 is frequently from 80 to 99.95% by weight, in particular from 80 to 99.8% by weight and especially from 80 to 99.5% by weight, based on the total weight of the monomer composition M.

According to a preferred embodiment, the at least one monoethylenically unsaturated monomer M2 is selected from acidic monomers and their salts.

Preferably, the monomers M2 are selected from the group consisting of monoethylenically unsaturated monocarboxylic acids having 3 to 6 carbon atoms and monoethylenically unsaturated dicarboxylic acids having 4 to 6 carbon atoms.

Suitable monomers M2 include, but are not limited to
monoethylenically unsaturated monocarboxylic acids having 3 to 6 carbon atoms, such as acrylic acid, methacrylic acid, crotonic acid, 2-ethylpropenoic acid, 2 propylpropenoic acid, 2-acryloxyacetic acid and 2-methacryloxyacetic acid,
monoethylenically unsaturated dicarboxylic acids having 4 to 6 carbon atoms, such as itaconic acid and fumaric acid.

Amongst the aforementioned monomers M2, preference is given to monocarboxylic acids. Particular preference is given to acrylic acid, methacrylic acid and mixtures thereof. In a particular group of embodiments, the monomer M2 comprises methacrylic acid. Especially, the monomer M2 is methacrylic acid or a mixture of acrylic acid and methacrylic acid.

The total amount of monomers M2 is generally from 0.05 to 5% by weight, in particular from 0.1 to 5% by weight, preferably from 0.2 to 5% by weight, especially from 0.5 to 4% by weight, based on the total weight of the monomer composition M.

Optionally, the monomers M further comprise at least one nonionic monoethylenically unsaturated monomer M3, which preferably has a functional group selected from a carboxamide group, a urea group and a keto group.

Examples for monomers M3 having a carboxamide group (hereinafter monomers Mia) are
primary amides of monoethylenically unsaturated monocarboxylic acids having 3 to 8 carbon atoms, such as acrylamide and methacrylamide;
N—$C_1$-$C_{10}$ alkyl amides of monoethylenically unsaturated monocarboxylic acids having 3 to 6 carbon atoms, in particular N—$C_1$-$C_{10}$ alkyl amides of acrylic acid or methacrylic acid, such as N-methyl acrylamide, N-ethyl acrylamide, N-propyl acrylamide, N-isopropyl acrylamide, N-butyl acrylamide, N-methyl methacrylamide, N-ethyl methacrylamide, N-propyl methacrylamide, N-isopropyl methacrylamide and N-butyl methacrylamide.

Examples for monomers M3 having a urea group (hereinafter monomers M3b) are 2-(2-oxo-imidazolidin-1-yl) ethyl acrylate, 2-(2-oxo-imidazolidin-1-yl)ethyl methacrylate, which are also termed 2-ureido (meth)acrylate, N-(2-acryloxyethyl)urea, N-(2-methacryloxyethyl)urea, N-(2-(2-oxo-imidazolidin-1-yl)ethyl) acrylamide, N-(2-(2-oxo-imidazolidin-1-yl)ethyl) methacrylamide, 1-allyl-2-oxoimidazolin and N-vinylurea Examples for monomers M3 having a keto group (hereinafter monomers M3c) are acetoacetoxyethyl acrylate, acetoacetoxypropyl methacrylate, acetoacetoxybutyl methacrylate, 2-(acetoacetoxy)ethyl methacrylate, diacetoneacrylamide (DAAM), diacetoneacrylamide and diacetonemethacrylamide.

Suitable monomers M3 may also include monoethylenically unsaturated silan functional monomers, e.g. monomers which in addition to an ethylenicallyl unsaturated double bond bear at least one mono-, di- and/or tri-$C_1$-$C_4$-alkoxysilane group, such as vinyl trimethoxysilane, vinyl triethoxysilane, methacryloxyethyl trimethoxysilane, methacryloxyethyl triethoxysilane, and mixtures thereof. The amount of silan functional monomers, if present, will frequently be in the range from 0.01 to 1 pphm;

Suitable monomers M3 may also include monoethylenically unsaturated monomers bearing at least one epoxy group, in particular a glycidyl group such as glycidyl acrylate and glycidyl metharylate.

Preferably, the monomers M3 are selected from primary amides of monoethylenically unsaturated monocarboxylic acids, in particular acrylamide, methacrylamide, monomers having a urea group, especially 2-ureido acrylate, 2-ureido methacrylate, and mixtures thereof.

The monomers M may also include multiethylenically unsaturated monomers (monomers 4), i.e. monomers having at least 2 non-conjugated ethylenically unsaturated double bounds. The amounts of said monomers M4 will generally not exceed 1 pphm based on the amount of monomers forming the polyfunctional polymer. Examples of multiethylenicallyl unsaturated monomers M4 include:
diesters of monoethylenically unsaturated $C_3$-$C_6$ monocarboxylic acids with saturated aliphatic or cycloaliphatic diols, in particular diesters of acrylic acid or methacrylic acid, such as the diacrylates and the dimethacrylates of ethylene glycol (1,2-ethanediol), propylene glycol (1,2-propanediol), 1,2-butanediol, 1,3-butanediol, 1,4-butanediol, neopentyl glycol (2,2-dimethyl-1,3-propanediol), 1,6-hexanediol and 1,2-cyclohexanediol;
monoesters of monoethylenically unsaturated $C_3$-$C_6$ monocarboxylic acids with monoethylenically unsaturated aliphatic or cycloaliphatic monohydroxy compounds, such as the acrylates and the methacrylates of vinyl alcohol (ethenol), allyl alcohol (2-propen-1-ol), 2-cyclohexen-1-ol or norbornenol, such as allyl acrylate and allyl methacrylate; and
divinyl aromatic compounds, such as 1,3-divinyl benzene, 1,4-divinyl benzene.

According to the invention, the monomers M are polymerized in the presence of at least one emulsifier E. This emulsifier serves for stabilizing the emulsion of the monomers and the polymer particles of the polymer latex. In addition to the emulsifier E a polymer surfactant, also termed "protective colloid" may also be present during the process of the invention. Protective colloids, as opposed to emulsifiers, are understood to mean polymeric compounds having molecular weights above 2000 Daltons, whereas emulsifiers typically have lower molecular weights. The emulsifier E may be anionic or nonionic or mixtures of non-ionic and anionic emulsifiers.

Anionic emulsifiers usually bear at least one anionic group, which is selected from phosphate, phosphonate, sulfate and sulfonate groups. The anionic emulsifier, which bear at least one anionic group, are typically used in the form of their alkali metal salts, especially of their sodium salts or in the form of their ammonium salts.

Preferred anionic are anionic emulsifiers, which bear at least one sulfate or sulfonate group. Likewise, anionic emulsifiers, which bear at least one phosphate or phosphonate group may be used, either as sole anionic emulsifiers or in combination with one or more anionic emulsifiers, which bear at least one sulfate or sulfonate group.

Examples of anionic emulsifiers, which bear at least one sulfate or sulfonate group, are, for example,

- the salts, especially the alkali metal and ammonium salts, of alkyl sulfates, especially of $C_8$-$C_{22}$-alkyl sulfates,
- the salts, especially the alkali metal and ammonium salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- the salts, especially the alkali metal and ammonium salts, of sulfuric monoesters of ethoxylated alkylphenols, especially of sulfuric monoesters of ethoxylated $C_4$-$C_{18}$-alkylphenols (EO level preferably 3 to 40),
- the salts, especially the alkali metal and ammonium salts, of alkylsulfonic acids, especially of $C_8$-$C_{22}$-alkylsulfonic acids,
- the salts, especially the alkali metal and ammonium salts, of dialkyl esters, especially di-$C_4$-$C_{18}$-alkyl esters of sulfosuccinic acid,
- the salts, especially the alkali metal and ammonium salts, of alkylbenzenesulfonic acids, especially of $C_4$-$C_{22}$-alkylbenzenesulfonic acids, and
- the salts, especially the alkali metal and ammonium salts, of mono- or disulfonated, alkyl-substituted diphenyl ethers, for example of bis(phenylsulfonic acid) ethers bearing a $C_4$-$C_{24}$-alkyl group on one or both aromatic rings. The latter are common knowledge, for example from U.S. Pat. No. 4,269,749, and are commercially available, for example as Dowfax® 2A1 (Dow Chemical Company).

Examples of anionic emulsifiers, which bear a phosphate or phosphonate group, include, but are not limited to the following salts are selected from the following groups:

- the salts, especially the alkali metal and ammonium salts, of mono- and dialkyl phosphates, especially $C_8$-$C_{22}$-alkyl phosphates,
- the salts, especially the alkali metal and ammonium salts, of phosphoric monoesters of $C_2$-$C_3$-alkoxylated alkanols, preferably having an alkoxylation level in the range from 2 to 40, especially in the range from 3 to 30, for example phosphoric monoesters of ethoxylated $C_8$-$C_{22}$-alkanols, preferably having an ethoxylation level (EO level) in the range from 2 to 40, phosphoric monoesters of propoxylated $C_8$-$C_{22}$-alkanols, preferably having a propoxylation level (PO level) in the range from 2 to 40, and phosphoric monoesters of ethoxylated-co-propoxylated $C_8$-$C_{22}$-alkanols, preferably having an ethoxylation level (EO level) in the range from 1 to 20 and a propoxylation level of 1 to 20,
- the salts, especially the alkali metal and ammonium salts, of phosphoric monoesters of ethoxylated alkylphenols, especially phosphoric monoesters of ethoxylated $C_4$-$C_{18}$-alkylphenols (EO level preferably 3 to 40),
- the salts, especially the alkali metal and ammonium salts, of alkylphosphonic acids, especially $C_8$-$C_{22}$-alkylphosphonic acids and
- the salts, especially the alkali metal and ammonium salts, of alkylbenzenephosphonic acids, especially $C_4$-$C_{22}$-alkylbenzenephosphonic acids.

Preferred anionic emulsifiers E are selected from the following groups:

- the salts, especially the alkali metal and ammonium salts, of alkyl sulfates, especially of $C_8$-$C_{22}$-alkyl sulfates,
- the salts, especially the alkali metal salts, of sulfuric monoesters of ethoxylated alkanols, especially of sulfuric monoesters of ethoxylated $C_8$-$C_{22}$-alkanols, preferably having an ethoxylation level (EO level) in the range from 2 to 40,
- of sulfuric monoesters of ethoxylated alkylphenols, especially of sulfuric monoesters of ethoxylated $C_4$-$C_{18}$-alkylphenols (EO level preferably 3 to 40), of alkylbenzenesulfonic acids, especially of $C_4$-$C_{22}$-alkylbenzenesulfonic acids, and
- of mono- or disulfonated, alkyl-substituted diphenyl ethers, for example of bis(phenylsulfonic acid) ethers bearing a $C_4$-$C_{24}$-alkyl group on one or both aromatic rings.

Suitable emulsifiers E may also be nonionic emulsifiers. Suitable nonionic emulsifiers are e.g. araliphatic or aliphatic nonionic emulsifiers, for example

- ethoxylated mono-, di- and trialkylphenols (EO level: 3 to 50, alkyl radical: $C_4$-$C_{10}$),
- ethoxylates of long-chain alcohols (EO level: 3 to 100, alkyl radical: $C_8$-$C_{36}$), and
- polyethylene oxide/polypropylene oxide homo- and copolymers. These may comprise the alkylene oxide units copolymerized in random distribution or in the form of blocks.

Amongst nonionic emulsifiers, preference is given to ethoxylates of long-chain alkanols, in particular to those where the alkyl radical $C_8$-$C_{30}$ having a mean ethoxylation level of 5 to 100 and, among these, particular preference to those having a linear $C_{12}$-$C_{20}$ alkyl radical and a mean ethoxylation level of 10 to 50, and also to ethoxylated monoalkylphenols.

Preferably, the emulsifier E comprises at least one anionic emulsifier, which bears at least one sulfate or sulfonate group. The at least one anionic emulsifier, which bears at least one sulfate or sulfonate group, may be the sole type of anionic emulsifiers. However, mixtures of at least one anionic emulsifier, which bears at least one sulfate or sulfonate group, and at least one anionic emulsifier, which bears at least one phosphate or phosphonate group, may also be used. In such mixtures, the amount of the at least one anionic emulsifier, which bears at least one sulfate or sulfonate group, is preferably at least 50% by weight, based on the total weight of anionic surfactants used in the process of the present invention. In particular, the amount of anionic emulsifiers, which bear at least one phosphate or phosphonate group does not exceed 20% by weight, based on the total weight of anionic surfactants used in the process of the present invention.

Preferably, the emulsifiers E comprise less than 20% by weight, especially not more than 10% by weight, of nonionic surfactants, based on the total amount of emulsifiers E used in the process of the present invention, and especially do not comprise any nonionic surfactant. In another embodiment of the invention, the surfactants used in the process of the present invention comprise at least one anionic surfactant and at least one non-ionic surfactant, the ratio of anionic surfactants to non-ionic surfactants being usually in the range from 0.5:1 to 10:1, in particular from 1:1 to 5:1.

Preferably, the emulsifier E will be used in such an amount that the amount of emulsifier is in the range from 0.2 to 5% by weight, especially in the range from 0.5 to 3% by weight, based on the total amount of monomers M polymerized in the process of the present invention.

Of course, further surfactants which are different from the emulsifiers E may additionally be used in the process of the present invention. Further suitable surfactants can be found in Houben-Weyl, Methoden der organischen Chemie [Methods of Organic Chemistry], volume XIV/1, Makromolekulare Stoffe [Macromolecular Substances], Georg-Thieme-Verlag, Stuttgart, 1961, p. 192-208. For example suitable further surfactants are e.g. copolymerizable surfactants, such as allyl and vinyl ethers of capped or non-capped polyethylene glycols and also esters of acrylic acid or methacrylic acid with OH-functional capped or non-capped polyethylene glycols, for example the Bisomer product range of GEO Specialty Chemicals.

Furthermore, of course, copolymerizable emulsifiers might be used as well. Suitable copolymerizable emulsifiers are for example disclosed in WO 2016/042116. Such copolymerizable emulsifiers usually have an ethylenically unsaturated moiety and thus are polymerizable and/or copolymerizable with the other monomers M under the conditions of an aqueous radical emulsion polymerization.

A first group of copolymerizable emulsifiers are phosphate esters of polyethylene glycol and monoacrylates and/or phosphonate esters of polyethylene glycol monoacrylates. Commercially available products are Maxemul® and Sipomer® PAM emulsifiers. Another group of copolymerizable emulsifiers are polyoxyalkylenealkenyl ether sulfates. Commercially available products are Latemul® PD emulsifiers. Another group of copolymerizable emulsifiers are branched unsaturated alkyl alkoxysulfonates and/or branched unsaturated alkyl alkoxysulfates. Commercially available products are Adeka® Reasoap emulsifiers. If used, such copolymerizable emulsifiers are usually applied in rather small quantities such as at most 1 pphm.

As outlined above, the process according to the present invention comprises the following steps:
i) aqueous radical emulsion polymerization of a first monomer composition M(1) forming either the polymer phase A or B, and subsequently
ii) aqueous radical emulsion polymerization a second monomer composition M(2) forming the other polymer phase A or B.

It is apparent that the polymerization of the first monomer composition M(1) in step i) may result in either the polymer phase A or in the polymer phase B while the polymerization of the second monomer composition M(2) in step ii) will result in the opposite polymer phase B or A, respectively. It is also apparent that the monomers of the monomer composition M(1) and M(2) are selected from monomers M as defined herein, in particular from the preferred monomers M. It is also apparent that the relative amounts of the different monomers within the monomer composition M(1) and M(2) respectively, in particular the relative amount of monomers M1a to M1b is chosen such that the desired theoretical Tg(A) or Tg(B), respectively is achieved.

According to the invention, the radical emulsion polymerization of the monomers M(1) forming the respective polymer phases is performed by a so-called feed process, which means that at least 95%, in particular at least 98% or the total amount of the monomers M(1) to be polymerized in the first polymerization stage are metered to the polymerization reaction under polymerization conditions during a metering period P(1). It is apparent that together with the monomers M(1) to the invention, at least a portion of the emulsifier E is also metered to the polymerization reaction during the period P(1). This portion is also termed emulsifier E(1). Frequently, the amount of emulsifier E which is metered to the polymerization reaction during the period P(1), i.e. the amount of emulsifier E(1) is in the range from 0.2 to 5% by weight, especially in the range from 0.5 to 3% by weight, based on the total amount of monomers M(1) polymerized in step i).

The duration of the period P(1) may depend on the production equipment and may vary from e.g. 20 minutes to 12 h. Frequently, the duration of the period P(1) will be in the range from 0.5 h to 5 h, especially from 1 h to 4 h.

The term "polymerization conditions" is generally understood to mean those temperatures and pressures under which the free-radically initiated aqueous emulsion polymerization proceeds at sufficient polymerization rate. They depend particularly on the free-radical initiator used. Advantageously, the type and amount of the free-radical initiator, polymerization temperature and polymerization pressure are selected such that a sufficient amount of initiating radicals is always present to initiate or to maintain the polymerization reaction.

In the process according to the invention, at least 95% of the first monomer composition M(1) are metered during a period P(1) to the polymerization reaction under polymerization conditions together with the emulsifier E(1). During the period P(1), at least one of the following measures i.1 or i.2 are taken:
i.1 during one period P(e) within said period P(1), an emulsifier E(e) is added with an addition rate that is at least 1.2 times higher, in particular at least 1.4 times higher than the average rate of addition of all emulsifiers added during the period P(1), and
i.2 during one period P(s) within said period P(1), a seed latex is added.

The periods P(e) and P(s) preferably start at a point of time t(s), where at least 2.5%, in particular at least 3.5% of the total amount of the monomers M, thus the total amount of the monomer compositions M(1) and M(2), have been metered to the polymerization reaction. Further preferably, the periods P(e) and/or P(s) start at a point of time t(s), where at least 4%, in particular at least 6% of the total amount of the monomer composition M(1) have been metered to the polymerization reaction.

The periods P(e) and/or P(s) preferably end at a point of time t(e), where at most 90% of the total amount of the monomer composition M(1) have been metered into the polymerization reaction. Further preferably, the periods P(e) and/or P(s) start at a point of time t(s), where at most 80%, further preferred at most 70%, of the total amount of the monomer composition M(1) have been metered to the polymerization reaction.

It is important to note that the periods P(e) and P(s) will be at a late point of time t(s) within this range, if the weight ratio of the amount of monomers of monomer composition M1 to the amount of monomers of monomer composition M2 is low, while it will be at an early point of time t(s) within this range, if the weight ratio of the amount of monomers of monomer composition M1 to the amount of monomers of monomer composition M2 is high. Thus, the periods P(e) and P(s) preferably end at a point of time t(e), where at most 70% of the total amount of the monomer composition M have been metered into the polymerization reaction. Further preferably, the periods P(e) and P(s) start at a point of time t(s), where at most 60%, further preferred at most 50%, of the total amount of the monomers M have been metered to the polymerization reaction.

The average rate of addition of an emulsifier is defined as the amount, by weight, of emulsifiers added per time. Thus, the addition rate is usually defined as "weight per time", thus usually in "g/min". The average rate of addition of all emulsifiers added during a period (e.g. period P(1)) is thus the total weight of all emulsifiers E added over the total period P(1).

According to a first group of embodiments, measure i.1 is taken. Thus, the process of first group of embodiments comprises the following steps:
i) aqueous radical emulsion polymerization of a first monomer composition M(1) forming either the polymer phase A or B, and subsequently
ii) aqueous radical emulsion polymerization a second monomer composition M(2) forming the other polymer phase A or B,
wherein at least 95%, in particular at least 98% of the first monomer composition M(1) are metered during a period P(1) to the polymerization reaction under polymerization conditions together with the emulsifier E(1), and
where during said period P(e) the total addition rate of all emulsifiers added during that period is at least 1.2 times, in particular at least 1.4 times higher than the average rate of addition of all emulsifiers added during the period P(1).

Without being bound by theory it is believed that during the period P(e) the concentration of emulsifiers in the reaction mixture is increased to a level which is slightly above the critical micelle concentration, while before the start of period P(e) it is slightly below the critical micelle concentration.

In this first embodiment of the present invention, an emulsifier E(e) is added with an addition rate such that the total addition rate of all emulsifiers added during the period P(e) is at least 1.2 times higher, in particular at least 1.4 times higher and specifically at least 1.6 times higher, than the average rate of addition of all emulsifiers E(1) added during the period P(1). The addition rate of emulsifier E(e) is more preferably from 1.2 to 50 times, in particular from 1.4 to 40 times and especially 1.5 to 40 times higher than the average rate of addition of emulsifier E(1) during the period P(1). It is apparent to a skilled person that for short periods P(e), the increase of the addition rate will be higher than for longer periods P(e).

The emulsifier E(e) that is added during the period P(e) can be identical with the emulsifier E(1) that is metered during the period P(1), thus, that has already been used in the process. The emulsifier E(e) might also be an emulsifier that has not been used in the process before the period P(e) and thus is different from emulsifier E(1). Likewise, the addition of emulsifier might be stopped or continued during the period P(e). Usually, the addition of emulsifier E(1) continues over the period P(1) and is not stopped during the period P(e).

Thus, the emulsifier E(e) that is added within the period P(e) might be same or different from the emulsifier E(1) that is metered outside the period P(e).

Preferably, the emulsifier that is added to the polymerization reaction during the period P(e) is an emulsifier E as described herein, especially an emulsifier selected from the group consisting of
the alkali and ammonium salts of $C_{10}$-$C_{20}$ alkyl sulfates, in particular the sodium and ammonium salts of $C_{10}$-$C_{16}$ alkyl sulfates,
the alkali and ammonium salts of sulfates ethoxylated $C_{10}$-$C_{20}$ alkanols having an average degree of ethoxylation of at most 7, in particular at most 5, in particular the sodium and ammonium salts thereof;
the alkali and ammonium salts of $C_6$-$C_{16}$ alkyl benzene sulfonates, in particular the sodium and ammonium salts thereof.

Of course, a mixture of emulsifiers might also be used during the period P(e).

An especially preferred emulsifier E(e) is sodium dodecylbenzene sulfonate. Another especially preferred emulsifier E(e) is the sodium salt of the sulfate of an ethoxylated $C_{12-14}$-alkanol having an average degree of ethoxylation of 4.

The emulsifier E(1), which is metered outside the period P(e), may be selected from the emulsifiers E as mentioned herein. It may be identical with or different from the emulsifier E(e), which is added during the period P(e). Since the emulsifier which is metered outside the period P(e) is usually not paused during the period P(e), frequently a mixture of different emulsifiers is added within the period P(e).

The total amount of emulsifier, which is added during the period P(e), is preferably in the range from 0.01 to 5.0% by weight, in particular from 0.05 to 2.5% by weight of the of the monomers polymerized during period P(1). The total amount of emulsifier, which is added during the period P(e), is preferably in the range from 0.005 to 3.0% by weight, in particular from 0.025 to 1.25% by weight of the of the total amount of monomers M polymerized during all periods P(1) and P(2).

The amount of emulsifier, which is added during the period P(e), is preferably in the range from 0.075 to 2% by weight, based on the total amount of emulsifiers E(1) used in the polymerization of the monomers M(1) during period P(1). The amount of emulsifier, which is added during the period P(e), is preferably in the range from 0.04 to 1.5% by weight based on the total amount of emulsifiers E(1) used in the polymerization of the monomers M during all periods P(1) and P(2).

Preferred emulsifiers E(1), which are different from the emulsifiers E(e) are selected from the group consisting of
the alkali and ammonium salts of sulfates ethoxylated $C_{10}$-$C_{20}$ alkanols having an average degree of ethoxylation of more than 4, e.g. from 7 to 50, in particular from 10 to 40, in particular the sodium and ammonium salts thereof; and
phosphate based emulsifiers, selected from the group consisting of the alkali and ammonium salts of mono and diesters of phosphoric acid with ethoxylated and/or propoxylated $C_{10}$-$C_{20}$ alkanols having an average degree of alkoxylation of more than 3, preferably in the range of 4 to 40, more preferably in the range of 5 to 20, whereas in particular the alkali and ammonium salts thereof are preferred.

According to a second embodiment, measure i.2 is taken. In a second embodiment of the present invention, at least 95% of the first monomer composition M(1) are metered during a period P(1) to the polymerization reaction under polymerization conditions together with a portion of the emulsifier, where during one period P(s) within said period P(1), a seed latex is added.

In this second embodiment, the seed latex is added during one period P(s) within said period P(1). The seed latex is understood to be an aqueous polymer dispersion of polymer particles.

Principally every aqueous polymer dispersion may serve as a seed latex, which volume average particle size is smaller than the volume average particle size of the first population of polymer particles in the final polymer dispersion, as determined by AUC. For the purpose of the invention, preference is given to seed latexes, where the Z-average particle size of the polymer particles in the seed latex is at most 80%, in particular at most 50%, e.g. from 10 to 80%, especially from 20 to 50% of the volume average particle size of the first population of polymer particles in the final polymer dispersion. In particular, the Z average particle diameter of the polymer particles of the seed latex, as determined by dynamic light scattering at 20° C. (see hereinabove) is preferably in the range from 10 to 80 nm, in particular from 10 to 50 nm. Preferably, the polymer particles of the seed latex is made of ethylenically unsaturated monomers, which comprise at least 95% by weight, based on the total weight of the monomers forming the seed latex, of one or more monomers M1 as defined above. The polymer particles of the seed latex particular comprise at least 95% by weight, based on the total weight of the monomers forming the seed latex, of at least one monomer M1b or of a mixture of at least one monomer M1b and one or more monomers M1a, where the proportion of monomers M1b to M1a is at least 50% on a weight basis. A specifically preferred seed latex is polystyrene latex.

The amount of seed latex, which is added during the period P(s), is preferably in the range of 0.1 to 10% by weight, in particular in the range of 0.5 to 8% by weight and more preferably in the range of 1 to 5% by weight, based of the total weight of the monomers M(1) polymerized during period P(1) and calculated as polymer solids of the seed latex. The amount of seed latex, which is added during the period P(s), is preferably in the range of 0.05 to 8% by weight, in particular in the range of 0.3 to 6% by weight and more preferably in the range of 0.5 to 4% by weight, based of the total weight of the monomers M polymerized during all periods P(1) and P(2) and calculated as polymer solids of the seed latex.

Of course, the process according to the invention may comprise both measure i.1 and i.2. However, the process preferably comprises either measure i.1 or measure i.2, whereas measure i.1 is preferred.

Irrespectively of whether measure i.1 or i.2 is taken, the periods P(e) and P(s) preferably start at a point of time t(s), where at least 2.5%, in particular at least 3.5% of the total amount of the monomers M, thus the total amount of the monomer compositions M(1) and M(2), have been metered to the polymerization reaction. Further preferably, the periods P(e) and P(s) start at a point of time t(s), where at least 4%, in particular at least 6% of the total amount of the monomer composition M(1) have been metered to the polymerization reaction.

Likewise, the periods P(e) and P(s) end at a point of time t(e), where at most 90% of the total amount of the monomer compositions M(1) have been metered into the polymerization reaction.

Further preferably, the period P(e) starts at a point of time t(s), where at least 2.5% in particular at least 3.5% of the total amount of the monomer composition M(1) have been metered to the polymerization reaction. Further preferably, the period P(e) ends a point of time t(s), where at most 50%, further preferred at most 30%, further preferred at most 20% of the total amount of the monomer composition M(1) have been metered to the polymerization reaction.

Further preferably, the period P(s) starts at a point of time t(s), where at least 10% in particular at least 20% of the total amount of the monomer composition M(1) have been metered to the polymerization reaction. Further preferably, the period P(s) ends a point of time t(s), where at most 90%, further preferred at most 80%, further preferred at most 75% of the total amount of the monomer composition M(1) have been metered to the polymerization reaction.

Preferably, the duration of the period P(e) is at most $\frac{1}{5}$ of the duration of period P(1), preferably at most $\frac{1}{8}$, more preferably at most $\frac{1}{10}$ of the period P(1). Further preferred, the period P(e) and/or P(s) is in the range of $\frac{1}{200}$ to $\frac{1}{5}$, preferably in the range of $\frac{1}{150}$ to $\frac{1}{8}$ more preferably in the range of $\frac{1}{100}$ to $\frac{1}{10}$ of the period P(1). The same applies for the duration of the period P(s).

Preferably, the duration of the period P(e) is typically at most 25 minutes, preferably at most 20 min and further preferred at most 15 minutes. A shorter period P(e) results in improved properties of the obtained polymer dispersions. The same applies for the duration of the period P(s).

Preferably, the rate of addition of the monomers M(1) is increased at least once during the period P(1). Further preferred, the rate of addition of the monomers M(1) at the beginning of the period P(1) is lower than the rate of addition of the monomers M(1) at the end of the period P(1). In particular, the rate of addition of the monomers M(1) at the end of the period P(1) is at least 2 times higher, e.g. from 2 to 20 times higher than the rate of addition of the monomers M(1) at the beginning of the period P(1). Likewise, the rate of addition of monomers M(2) can be increased at least once during the addition period of monomers M(2).

It has been found advantageous to perform the free-radical emulsion polymerization of monomers M(1) in the presence of a seed latex. In this case, the seed latex is typically present in the aqueous polymerization medium before the metering of the monomers M(1) is started. The seed latex may help to better adjust the particle size of the final polymer latex obtained in the free-radical emulsion polymerization of the invention. In particular, seed latex is added prior to the start of period P(1). However, it is also possible to prepare the seed latex in situ.

For this, the seed latex is usually charged into the polymerization vessel before the metering of the monomers M(1) is started. In particular, the seed latex is charged into the polymerization vessel followed by establishing the polymerization conditions and charging at least a portion of the free-radical initiator into the polymerization vessel before the metering of the monomers M(1) is started.

The amount of seed latex S, calculated as solids, which is added prior to the start of period P(1) may frequently be in the range from 0.01 to 2% by weight, in particular from 0.02 to 1% by weight, based on the total weight of the monomers M.

The seed latex that is added prior to the start of period P(1) might be the same seed latex that added in period P(s). The seed latex that added in period P(s) might also be a seed latex that has not been used in the process before the period P(s). Usually, the seed latex that is added during the period P(s) has already been used in the process.

In a preferred embodiment, the process is carried out by first polymerizing a monomer composition M(1) to form the polymer phase A having a theoretical glass transition temperature Tg(A) and subsequently by polymerizing a monomer composition M(2) to form the polymer phase B having a theoretical glass temperature Tg(B).

Preferably, a seed latex is added prior to the start of polymerizing the monomer composition M(1).

Monomers M(2) can be added as a single shot to the polymer dispersion obtained in step i). Preferably at least 90% or in particular at least 95% of the second monomer composition M(2) are metered during a second period P(2) to the polymerization reaction under polymerization conditions together with further amount of emulsifier. Frequently, the amount of emulsifier E which is used in step ii) is in the range from 0.2 to 5% by weight, especially in the range from 0.5 to 3% by weight, based on the total amount of monomers M(2) polymerized in step ii).

The conditions required for the performance of the radical emulsion polymerization of the monomers M are sufficiently familiar to those skilled in the art, for example from the prior art cited at the outset and from "Emulsionspolymerisation" [Emulsion Polymerization] in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Interscience Publishers, New York (1965); DE 4003422 A and Dispersionen synthetischer Hochpolymerer [Dispersions of Synthetic High Polymers], F. Hölscher, Springer-Verlag, Berlin (1969)].

The free-radically initiated aqueous emulsion polymerization is triggered by means of a free-radical polymerization initiator (free-radical initiator). These may in principle be peroxides or azo compounds. Of course, redox initiator systems are also useful. Peroxides used may, in principle, be inorganic peroxides, such as hydrogen peroxide or peroxodisulfates, such as the mono- or di-alkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis(2,4-dimethylvaleronitrile) and 2,2' azobis(amidinopropyl) dihydrochloride (AIBA, corresponds to V-50 from Wako Chemicals). Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Preferred free-radical initiators are inorganic peroxides, especially peroxodisulfates, and redox initiator systems.

In general, the amount of the free-radical initiator used, based on the total amount of monomers M, is 0.01 to 5 pphm, preferably 0.1 to 3 pphm.

The amount of free-radical initiator required in the process of the invention for the emulsion polymerization M(1) and M(2) can be initially charged in the polymerization vessel completely. However, it is also possible to charge none of or merely a portion of the free-radical initiator, for example not more than 30% by weight, especially not more than 20% by weight, based on the total amount of the free-radical initiator required in the aqueous polymerization medium and then, under polymerization conditions, during the free-radical emulsion polymerization of the monomers M(1) and M(2) to add the entire amount or any remaining residual amount, according to the consumption, batchwise in one or more portions or continuously with constant or varying flow rates.

The free-radical aqueous emulsion polymerization of the invention is usually conducted at temperatures in the range from 0 to 170° C. Temperatures employed are frequently in the range from 50 to 120° C., in particular in the range from 60 to 120° C. and especially in the range from 70 to 110° C.

The free-radical aqueous emulsion polymerization of the invention can be conducted at a pressure of less than, equal to or greater than 1 atm (atmospheric pressure), and so the polymerization temperature may exceed 100° C. and may be up to 170° C. Polymerization of the monomers is normally performed at ambient pressure but it may also be performed under elevated pressure. In this case, the pressure may assume values of 1.2, 1.5, 2, 5, 10, 15 bar (absolute) or even higher values. If emulsion polymerizations are conducted under reduced pressure, pressures of 950 mbar, frequently of 900 mbar and often 850 mbar (absolute) are established. Advantageously, the free-radical aqueous emulsion polymerization of the invention is conducted at ambient pressure (about 1 atm) with exclusion of oxygen, for example under an inert gas atmosphere, for example under nitrogen or argon.

The polymerization of the monomers M(1) and M(2) can optionally be conducted in the presence of chain transfer agents. Chain transfer agents are understood to mean compounds that transfer free radicals and which reduce the molecular weight of the growing chain and/or which control chain growth in the polymerization. Examples of chain transfer agents are aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2 pentanethiol, 3-pentanethiol, 2-methyl-2-butanethiol, 3-methyl-2-butanethiol, n hexanethiol, 2-hexanethiol, 3-hexanethiol, 2-methyl-2-pentanethiol, 3-methyl-2 pentanethiol, 4-methyl-2-pentanethiol, 2-methyl-3-pentanethiol, 3-methyl-3 pentanethiol, 2-ethylbutanethiol, 2-ethyl-2-butanethiol, n-heptanethiol and the isomeric compounds thereof, n-octanethiol and the isomeric compounds thereof, n nonanethiol and the isomeric compounds thereof, n-decanethiol and the isomeric compounds thereof, n-undecanethiol and the isomeric compounds thereof, n dodecanethiol and the isomeric compounds thereof, n-tridecanethiol and isomeric compounds thereof, substituted thiols, for example 2-hydroxyethanethiol, aromatic thiols such as benzenethiol, ortho-, meta- or paramethylbenzenethiol, alkylesters of mercaptoacetic acid (thioglycolic acid), such as 2-ethylhexyl thioglycolate, alkylesters of mercaptopropionic acid, such as octyl mercapto propionate, and also further sulfur compounds described in Polymer Handbook, 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane, or hydrocarbons having readily abstractable hydrogen atoms, for example toluene. Alternatively, it is possible to use mixtures of the aforementioned chain transfer agents that do not disrupt one another. The total amount of chain transfer agents optionally used in the process of the invention, based on the total amount of monomers M(1) and M(2), will generally not exceed 1% by weight. However, it is possible, that during a certain period of the polymerization reaction the amount of chain transfer agent added to the polymerization reaction may exceed the value of 1% by weight, based on the total amount of monomers already added to the polymerization reaction.

The free-radical emulsion polymerization of the invention is usually effected in an aqueous polymerization medium, which, as well as water, comprises at least one surface-active substance, so-called surfactants, for stabilizing the emulsion of the monomers and the polymer particles of the polymer latex. Suitable surfactants are mentioned hereinabove.

It is frequently advantageous when the aqueous polymer dispersion obtained on completion of polymerization of the monomers M is subjected to a post-treatment to reduce the residual monomer content. This post-treatment is effected either chemically, for example by completing the polymerization reaction using a more effective free-radical initiator system (known as post-polymerization), and/or physically, for example by stripping the aqueous polymer dispersion with steam or inert gas. Corresponding chemical and physical methods are familiar to those skilled in the art, for example from EP 771328 A, DE 19624299 A, DE 19621027 A, DE 19741184 A, DE 19741187 A, DE 19805122 A, DE 19828183 A, DE 19839199 A, DE 19840586 A and DE 19847115 A. The combination of chemical and physical post-treatment has the advantage that it removes not only the unconverted ethylenically unsaturated monomers but also other disruptive volatile organic constituents (VOCs) from the aqueous polymer dispersion.

A further object of the present invention are aqueous polymer dispersions of polymerized ethylenically unsaturated monomers M obtainable by the process as described herein.

Preferred embodiments of the aqueous polymer dispersions are those mentioned herein, in particular those that are described with respect to the process as described herein.

The aqueous polymer dispersion of the invention will typically have polymer solids contents in the range from 55 to 74 wt.-%. Preferably, the aqueous polymer dispersion obtainable by the process according to the invention has polymer content of at least 58 wt.-%, in particular in the range of 58 to 70 wt.-% and especially the range of 58% to 68% by weight, based on the total weight of the aqueous polymer dispersion. The polymer content can be determined experimentally by drying 2 g of the polymer dispersion in an aluminum crucible at 130° C. for 2 h according to ISO 124:2014(en).

The process according to the invention produces the aqueous polymer dispersion comprising a first population of small polymer particles and a second population of large polymer particles, where the weight ratio of the polymer particles of the first population to the polymer particles of the second population is at most 1:1. The weight ratio of the polymer particles of the first population to the polymer particles of the second population is preferably in the range of 10:90 to 50:50.

The size of the particles as well as the distribution of particle size are usually determined by analytical ultracentrifugation (AUC) with turbidity optics and Mie correction of the transmitted intensities for each size. The method uses homogeneous start sedimentation. The method adheres to ISO 13318-1, and the specific setup is described in W. Mächtle, L. Börger, "Analytical Ultracentrifugation of Polymers and Nanoparticles" chapter 3, Springer Science and Business Media, Berlin 2006, chapter 3. The evaluation assumes spherical shape, solid particles of the skeletal density given by the comonomer composition. Results are given in volume metrics of spherical-equivalent diameters.

Usually, the particle size distribution, as determined by AUC of the polymer particles in the polymer dispersion obtainable by the process as described herein has a first maximum in the range of 30 to 150 nm and a second maximum in the range of 200 to 500 nm. Preferably, said first maximum is in the range of 50 to 130 nm and said second maximum is in the range of 250 to 400 nm.

In a preferred embodiment, the weight ratio, as determined by AUC, of small mode particles, thus of the first population, as described herein to large mode particles, thus of the second population, as described herein is in the range of 5:95 to 50:50, preferably in the range of 10:90 to 50:50, in particular in the range from 12:88 to 45:55 and especially in the range from 14:86 to 40:60.

In particular, the dispersion comprises 10 to 50 wt.-%, preferably 12 to 45 wt.-%, based on the total amount of polymer particles, of small mode particles as described herein, and 50 to 90 wt.-%, preferably 55 to 88 wt.-%, based on the total amount of polymer particles, of large mode particles as described herein. The amount of particles is determined by the AUC as described herein.

Preferably, the polymer dispersion comprises small mode particles, where at least 90 wt.-% of the small mode particles have a diameter in the range of 30 to 150 nm, preferably in the range of 50 to 130 nm. In particular, the polymer dispersion comprises large mode particles, where at least 90 wt.-% of the large mode particles have a diameter in the range of 200 to 500 nm, preferably in the range in the range of 250 to 400 nm.

The weight average diameter of the particles comprised in the polymer dispersion is usually in the range of 100 to 500 nm, preferably in the range in the range of 200 to 400 nm, in particular in the range of 250 to 350 nm, as determined by AUC.

The process for producing an aqueous polymer dispersion of polymerized ethylenically unsaturated monomers M produces a polymer dispersion having a polymer content of at least 55 wt. %, based on the total weight of the aqueous polymer dispersion. Preferably, the aqueous polymer dispersion according to the present invention has a polymer content of at least 57 wt.-%, more preferably at least 58 wt.-%, based on the total weight of the aqueous polymer dispersion. Preferably, the aqueous polymer dispersion according to the present invention has a polymer content in the range of 58 to 65 wt.-%, based on the total weight of the aqueous polymer dispersion.

Due to the different monomer compositions M1 and M2 polymerized in the process of the invention, the polymer particles contained in the polymer dispersion contain a polymer phase having a low glass transition temperature Tg(A) and a polymer phase having a higher glass transition temperature Tg(B). The relative amount of the polymer phase A having the lower glass transition temperature Tg(A) to the polymer phase B having the higher glass transition temperature Tg(B) corresponds to the relative amounts of monomers forming the polymer phase A to the monomers forming the polymer phase B. Consequently, the weight ratio of the polymer phase A having the lower glass transition temperature Tg(A) to the polymer phase B having the higher glass transition temperature Tg(B) as described herein is frequently in the range of from 50:50 to 95:5, and in particular in the range of from 60:40 to 90:10.

The polymer particles may have a third polymer phase C with a third glass transition temperature Tg(C). In case that the polymer particles produced by the process according to the invention comprise a polymer phase with a third glass transition temperature Tg(C), this glass transition temperature Tg(C) might be below Tg(A), between Tg(A) and Tg(B) or above Tg(B). Likewise, the particles may also have further glass transition temperatures. However, the polymer particles according to the invention usually have at most 3 glass transition temperatures.

The seed latex that can be used in the process as described herein is preferably added previous to the start of the polymerization. The seed latex is preferably made of polymerized monomers which comprise styrene. More preferably, the seed latex consists of polystyrene homopolymers and/or copolymers consisting to at least 50% by weight of polystyrene, more preferably of polystyrene homopolymers.

In a preferred embodiment, the polymer particles contained in the polymer dispersion obtained by the process as described herein comprise
- 10 to 95 wt.-%, preferably 20 to 90 wt.-%, based on the total weight of the polymer particles, of the polymer phase having the lower glass transition temperature Tg(A) and
- 5 to 90 wt.-%, preferably 10 to 80 wt.-%, based on the total weight of the polymer particles, of the polymer phase having the higher glass transition temperature Tg(B).
- 0 to 5 wt.-%, preferably 0 to 2 wt.-%, based on the total weight of the polymer particles, of a polymer phase having the glass transition temperature Tg(C).

In a particular embodiment, the aqueous polymer dispersion according to the present invention comprises
- 12 to 60 wt.-%, based on the total amount of polymer particles, of small mode polymer particles, and
- 40 to 88 wt.-%, based on the total amount of polymer particles, of large mode polymer particles, where both the small mode polymer particles and the large mode polymer particles comprise
- 10 to 95 wt.-%, preferably 20 to 90 wt.-%, based on the total weight of the polymer particles, of the polymer phase having the lower glass transition temperature Tg(A) and
- 5 to 90 wt.-%, preferably 10 to 80 wt.-%, based on the total weight of the polymer particles, of the polymer phase having the higher glass transition temperature Tg(B).
- 0 to 5 wt.-%, preferably 0 to 2 wt.-%, based on the total weight of the polymer particles, of a polymer phase having the glass transition temperature Tg(C), where the glass transition temperature Tg(A) is in the range of −30 to +60° C., preferably in the range of −20 to 50° C. and especially in the range from −10 to 30° C. and the glass transition temperature Tg(B) is in the range of +30° C. to +160° C., preferably in the range of 40 to 130° C. and especially in the range from 50 to 120° C., provided that Tg(B)−Tg(A) is at least 10° C., in particular at least 20° C., especially at least 40° C.

A further object of the present invention are aqueous liquid compositions comprising at least one aqueous polymer dispersion as defined herein.

Preferred embodiments of the aqueous liquid compositions are those mentioned herein, in particular those that are described with respect to the process as described herein.

The aqueous liquid composition is preferably used as a coating composition and/or a latex coating composition and/or a latex paint composition.

The aqueous liquid composition usually comprises the aqueous polymer dispersion and water. The liquid composition usually does not comprise any volatile organic compound. In case that volatile organic compounds are present, the concentration of said compounds is usually below 0.2 wt.-%, preferably below 0.1 wt.-%, more preferably below 0.05 wt.-%, based on the total amount of liquid composition and preferably based on the amount of polymer contained in the composition. A volatile compound in terms of the invention is a compound, which has a boiling point at 1013 mbar of less than 250° C.

The aqueous liquid composition comprising at least one aqueous polymer dispersion as defined herein usually further comprises a rheology modifying agent. Suitable rheology modifying agents include associative thickener polymers and non-associative rheology modifiers. The aqueous liquid composition preferably comprises a thickening agent selected from the group consisting of associative thickeners and optionally a non-associative thickener.

Such associative thickeners, also termed as associative thickener polymer, associative rheology modifier polymers or associative rheology modifiers as often used for adjusting the desired rheology profile of the latex paint, optionally in combination with one or more non-associative rheology modifiers. In contrast to the non-associative rheology modifiers the associative rheology modifiers interact by associative interaction of their hydrophobic moieties with the components of the latex paint, in particular with the polymer particles of the latex and also with the pigments, thereby forming a reversible dynamic network which imparts the particular rheological properties to the paint.

Associative thickener polymers are well known and frequently described in the scientific literature, e.g. by E. J. Schaller et al., "Associative Thickeners" in Handbook of Coating Additives, Vol. 2 (Editor L. J. Calbo), Marcel Decker 192, pp. 105-164, J. Bieleman "PUR-Verdicker" in Additives for Coatings (Editor J. Bielemann), Wiley 2000, pp 50-58. NiSAT thickener polymers of the HEUR and HMPE type are also described in the patent literature, such as U.S. Pat. Nos. 4,079,028, 4,155,892, EP 61822, EP 307775, WO 96/31550, EP 612329, EP 1013264, EP 1541643, EP 1584331, EP 2184304, DE 4137247, DE 102004008015, DE 102004031786, US 2011/0166291 and WO 2012/052508. Apart from that, associative thickener polymers are commercially available.

The associative thickener polymer usually contains on average at least two hydrophobic moieties within one polymer molecule and one or more hydrophilic moieties which render them water soluble. The hydrophobic moieties may be arranged as side chains on a hydrophilic polymer backbone or they may form end-groups of a linear or branched polymer having an interior hydrophilic block, which may be interrupted by one or more hydrophobic blocks. The hydrophobic moieties are usually hydrocarbon radicals, which have at least 4 carbon atoms and which in particular have from 4 to 24 carbon atoms. Suitable hydrocarbon radicals include linear or branched alkyl radicals having from 4 to 24 carbon atoms. Suitable hydrocarbon radicals also include alkyl substituted phenyl radicals having from 4 to 24 carbon atoms.

The associative thickener polymers include anionic, acrylate type thickener polymers, so-called HASE polymers (hydrophobically modified polyacrylate thickeners), which are copolymers of acrylic acid and alkyl acrylate monomers, where the alkyl group of the alkyl acrylate may have from 6 to 24 carbon atoms. The associative thickener polymers also include non-ionic associative thickeners, so called NiSAT thickeners (non-ionic synthetic associative thickeners), which usually are linear or branched block copolymers having at least one interior hydrophilic moiety, in particular a polyether moiety, especially at least one polyethylene oxide moiety and two or more terminal hydrocarbon groups each having at least 4 carbon atoms, in particular from 4 to 24 carbon atoms, e.g. a linear or branched alkyl radical having 4 to 24 carbon atoms or alkyl substituted phenyl having 7 to 24 carbon atoms. NiSAT thickeners include the hydrophobically modified polyethylene oxide urethane rheology modifiers, also termed HEUR or PUR thickeners, and hydrophobically modified polyethyleneoxides, which are also termed HMPE.

Preferably the aqueous liquid composition contains at least one associative thickener, which is selected from the group consisting of
  hydrophobic ethoxylated urethan resins (HEUR) thickening agents,
  hydrophobized alkali soluble/swellable emulsions (HASE) thickening agents,
  hydrophobically modified polyether (HMPE) thickening agents,
and mixtures thereof.

HEUR are characterized by having at least one polyethylene oxide block, at least two hydrophobic groups and one or more carbamate groups resulting from the reaction of an OH-functional monomer, e.g. the polyethyleneoxide a hydrophobically modified polyethyleneoxide or a hydrophobic alcohol with a di- or polyisocyanate.

HASE type associative thickeners, i.e. hydrophobically modified polyacrylate thickeners, are copolymers of acrylic acid and one or more alkyl acrylate monomers, where the alkyl group of the alkyl acrylate may have from 6 to 24 carbon atoms.

HMPE are characterized by having a central linear or branched polyethylene oxide group, which at its termini bears hydrophobic groups, in particular terminal hydrocarbon groups as defined above, which are either directly bound or via a linker.

The amount of the associative thickener polymer will depend on the desired viscosity profile and is frequently in the range from 0.05 to 2.5% by weight, in particular 0.1 to 2% by weight of thickener, and especially 0.2 to 2% by weight, based on the latex paint.

Suitable non-associative rheology modifiers are in particular cellulose based thickeners, especially hydroxyethyl cellulose, but also thickeners based on acrylate emulsions (ASE). Amongst the non-associative rheology modifiers preference is given to non-associative cellulose based thickeners.

In addition to the associative thickener polymer the latex paint may also contain one or more non-associative rheology modifiers. Suitable non-associative rheology modifiers are in particular cellulose based thickeners, especially hydroxyethyl cellulose, but also thickeners based on acrylate emulsions (ASE). Preference is given to non-associative cellulose based thickeners. The amount of the non-associative thickener polymer will depend on the desired viscosity profile and is frequently in the range from 0.05 to 1.5% by weight, in particular 0.1 to 0.8% by weight of thickener, and especially 0.15 to 0.8% by weight, based on the latex paint.

The total amount of the thickener polymer will depend on the desired viscosity profile and is frequently in the range from 0.05 to 2.5% by weight, in particular 0.1 to 2% by weight of thickener, and especially 0.15 to 1.5% by weight, based on the latex paint.

The aqueous polymer dispersions of the invention are particularly useful for preparing waterborne coating compositions. Waterborne coating compositions include both waterborne paints and waterborne clear coats. Waterborne paints contain, in addition to the polymer dispersion at least one particulate solid selected from pigment and fillers, in particular at least one pigment and optionally at least one filler. In contrast thereto, a clear coat is a waterborne coating composition, which does not contain any pigment or filler.

In a preferred embodiment, the aqueous liquid composition is a paint, which contains at least one of pigment and fillers and at least one associative thickener as defined above.

The proportion of the pigments and fillers in coating compositions can be described in a manner known per se via the pigment volume concentration (PVC). The PVC describes the ratio of the volume of pigments (VP) and fillers (VF) relative to the total volume, consisting of the volumes of binder (VB), pigments (VP) and fillers (VF) in a dried coating film in percent: PVC=(VP+VF)×100/(VP+VF+VB).

The compositions usually have a pigment volume concentration (PVC) of at least 5, especially at least 10. Preferably, the PVC will not exceed a value of 60, especially 40, and is specifically in the range from 5 to 60 or 5 to 40. However, the inventive effects of the polymer dispersions are also manifested in varnishes which typically have a pigment/filler content below 5% by weight, based on the varnish, and correspondingly have a PVC below 5.

A higher solids content binder allows for higher loadings of inorganic pigments such as $TiO_2$, while maintaining the same PVC in current state-of-the-art commercial paints.

A higher solids content binder allows for higher loadings of inorganic pigments such as $TiO_2$, while maintaining the same PVC in current state-of-the-art commercial paints.

The aqueous coating compositions of the invention may also comprise customary auxiliaries. The customary auxiliaries will depend from the kind of the coating in a well-known manner and include but are not limited to:
  wetting agents or dispersants,
  filming auxiliaries, also termed coalescents,
  leveling agents,
  biocides and
  defoamers.

Suitable wetting agents or dispersants are, for example, sodium polyphosphates, potassium polyphosphates or ammonium polyphosphates, alkali metal salts and ammonium salts of acrylic acid copolymers or maleic anhydride copolymers, polyphosphonates, such as sodium 1-hydroxyethane-1,1-diphosphonate, and naphthalenesulfonic salts, especially the sodium salts thereof.

Further formulation ingredients for water-borne paints are described in detail in M. Schwartz and R. Baumstark "Water-based Acrylates for Decorative Coatings", Curt R. Vincentz Verlag, Hanover, 2001, p. 191-212 (ISBN 3-87870-726-6).

The aqueous polymer dispersions as defined herein and/or the aqueous liquid compositions comprising at least one aqueous polymer dispersion as defined herein are preferably used as a coating composition and/or as a latex coating composition and/or as a latex paint composition.

A further embodiment of the present invention are methods of producing a decorative coating on a surface comprising
(a) applying the aqueous polymer dispersions as defined herein and/or the aqueous liquid compositions comprising at least one aqueous polymer dispersion as defined herein to the surface, and
(b) allowing the composition to dry to produce the coating.

If the liquid composition is a paint, the paint can be used for providing a decorative coating on arbitrary surfaces, in particular for coatings of interior or exterior walls or ceilings or for coating wood, metal and plastic. The latex paint may be applied to substrates to be coated in a customary manner, for example by applying the paint with brushes or rollers, by spraying, by dipping, by rolling, or by bar coating. Preferred applications are by brush and/or by roller.

In this case, the coating of substrates is effected in such a way that the substrate is first coated with an aqueous coating formulation of the invention and then the aqueous coating is subjected to a drying step, especially within the temperature range of ≥−10 and ≤50° C., advantageously ≥5 and ≤40° C. and especially advantageously ≥10 and ≤35° C.

The invention is to be illustrated by non-limiting examples which follow.

FIGURES

FIG. 1 shows a comparison of backward loop flow curves, thus the viscosity as a function of shear rate of a waterborne paint formulation containing the binder of example 13-2, of a waterborne paint formulation containing the binder of comparative example 2 (Comp Example 2) and of a commercial high solids solvent-borne paint (Comp Ex solvent-borne). The commercial high solids solvent-borne paint shows a viscosity behavior close to Newtonian (i.e. viscosity independent of shear rate) in the backward loop. The water borne paint formulation containing the binder of Example 13-2 shows almost close Newtonian viscosity behavior with having a slightly lower viscosity in the high shear region and only moderately higher viscosity in the low shear region. In particular, Example 13-2 shows a rather comparable viscosity behavior in the mid shear region vs Comp Ex solvent-borne. Comparison of the waterborne paint formulation containing the binder of 13-2 with the waterborne paint formulation containing the binder of comparative example 2 shows similar high shear behavior. However, the waterborne paint formulation containing the binder of comparative example 2 shows much higher viscosities in both low and mid shear regions.

Figure 2:
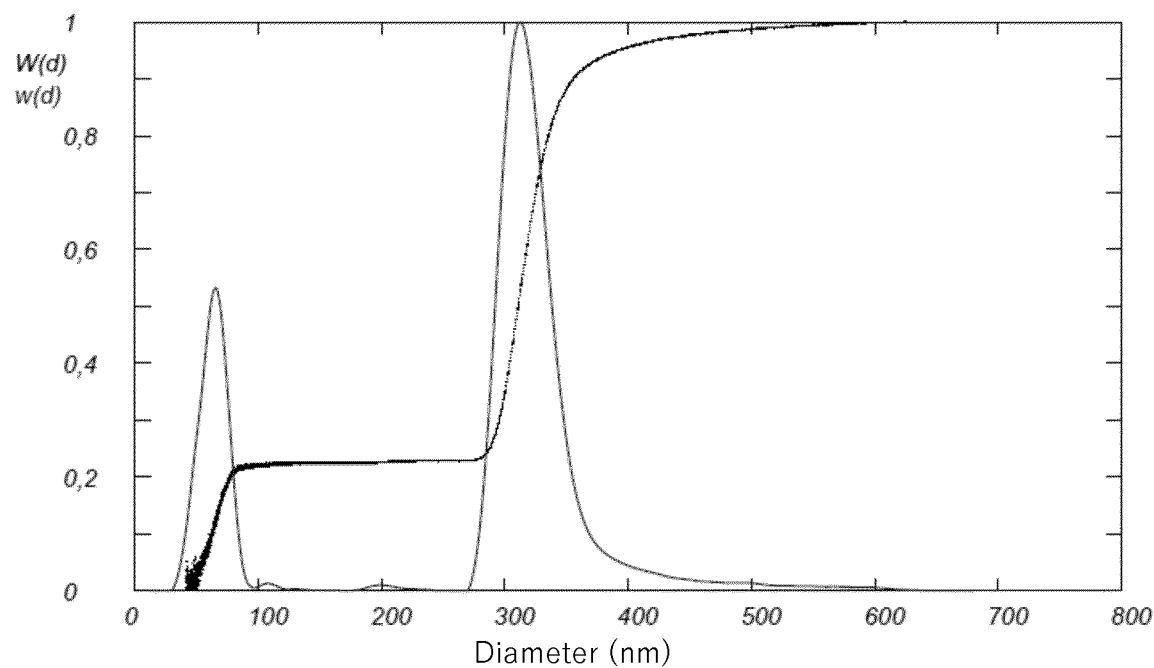

FIG. 2 shows the particle size distribution of example 14. The dispersion clearly shows two distinct polymer particles populations.

EXAMPLES

1. Analytics
1.1 Solids Content

The solids content was determined by drying a defined amount of the aqueous polymer dispersion (about 2 g) to constant weight in an aluminum crucible having an internal diameter of about 5 cm at 130° C. in a drying cabinet (2 hours). Two separate measurements were conducted. The value reported in the example is the mean of the two measurements.

1.2 Particle Diameter

The size of the particles polymer latex as well as the distribution of particle size were determined by analytical ultracentrifugation (AUC) with turbidity optics and Mie correction of the transmitted intensities for each size. The method uses homogeneous start sedimentation. The method adheres to ISO 13318-1, and the specific setup is described in W. Mächtle, L. Börger, "Analytical Ultracentrifugation of Polymers and Nanoparticles" chapter 3, Springer Science and Business Media, Berlin 2006, chapter 3. The evaluation assumes spherical shape, solid particles of the skeletal density given by the comonomer composition. Results are given in volume metrics of spherical-equivalent diameters.

1.3 Viscosity

Flow curves of the latex paints were determined with a rotational rheometer (Anton Paar MCR 302) in cone-plate geometry (CP50-1; S/N 44086), with the cone and plate at a distance of d=0.103 mm and a temperature of 23° C. The controlled shear rate (CSR) program is set as follows: after the material has been transferred to the measuring head and the cone has been lowered, the material is equilibrated for 120 s at 23° C. After this another equilibration period of 60 s at a shear rate 0.03 $s^{-1}$ is granted. Hereafter a forward loop with increasing shear rates from 0.03 $s^{-1}$ to 6000 $s^{-1}$ with 40 data points. The machine automatically calculates, at which shear rates it should measure, so that on a logarithmic scale the 40 data points on the x-axis displaying the shear rate are equally spaced. For each datapoint it measures the torque (that is then calculated into a viscosity value by the Anton Paar software) until a.) there is, within statistical error, no change or b.) until 15 s have passed. Once the machine has measured the viscosity at a shear rate of 6000 $s^{-1}$ on the forward loop it initiates the so-called backward loop with the same 40 datapoints, once again logarithmically spaced, going back down to a shear rate of 0.03 $s^{-1}$. The software automatically generates plots with the viscosity displayed as a function of the different shear rates.

Single point viscosity measurements have also been carried out according to ISO2884-1/ASTM D4287 using an ICI high shear cone plate viscometer and according to ASTM D562 using a Stormer type viscometer measuring Krebs Units (KU).

Viscosity of the dispersion was measured according to ASTM D2196 using a Brookfield viscometer with LV spindles at 23° C.

1.4 Pendulum Hardness (König's Hardness)

Pendulum hardness measurements have been carried out according to DIN 53157. The dispersion/paint formulation is cast onto a glass substrate using an Erichsen doctor blade with an opening of 150 microns. After drying for 24 h at room temperature (RT), the König's hardness (in seconds) is measured.

1.5 Blocking Resistance

Pine panels of 150×50×5 mm were used for testing the blocking resistance. 300 microns of the wet paint were applied. Samples were dried for 24 h at RT. The test pieces were then stacked face to face in a cross-like fashion for 3 h at RT, with a pressure of 150 g/$cm^2$. After these 3 hours the pieces were separated and rated.

0=films are easy to separate without damage (no sound)
1=films separate without damage (slight sound)
2=films separate with some damage
3=blocking, films show damage after separation, but no film brake 4=blocking, films show severe damage after separation, but no film brake 5=blocking, films are very hard or not able to separate, severe film brake 1.6 Water Uptake Water uptake of the paint film was measured as follows. Free-standing films were prepared by casting 1000 microns of wet paint using a doctor blade onto a teflonized metal plate for easy release. After drying for 14 days at RT and 50% RH circular paint specimens with a diameter of 3.5 cm were cut from the dried paint film. These were weighed and subsequently stored in DI-water at RT for 24 h. The films were then removed from the water, dried with a paper towel and weighed again. The difference between the weight after and before water contact divided by the weight before water contact then gives the water-uptake in %.

1.7 Further Methods

The practical spread rate of the paints was determined using a modified brushout method as described in ASTM D344 under point 7.5. The paint brush under use was a Storch Aquastar 50 (Art. Nr. 041950) from Storch GmbH, Wuppertal, and used in all paint experiments: it was thoroughly cleaned with DI-water and dried before loading the brush with the respective test paint. The formulated paints in the examples (vide infra) were applied to a Leneta CU-1M grayscales chart with overall dimensions of 610×946 mm that were glued to a wooden carrier material. The chart is divided into two roughly equal surface areas by applying a painter's tape in the middle of the chart. The chart was subsequently placed vertically on a bench with an angle of 10+/−5 degrees to the normal. A balance was used to determine the weight of the paint applied to the substrate. Although this can be done directly by placing the whole set-up onto the balance, for practical purposes the balance was placed directly next to the panel: the wetted paint brush and paint can were weighed before and after the paint application process.

The paint process itself involves loading brush properly with paint, not too much in order to avoid dripping and not too little in order to apply sufficient amount of paint to be spread onto the surface. This typically requires many paint transfer steps. Paint is first spread primarily from left to right and vice versa as well as well from the top to the bottom on smaller areas. By the time sufficient amount of paint has been transferred to the surface, a proper brushout is undertaken, repeating the brushing process but spreading the paint over larger areas. The paint job is judged based on simultaneous visual and sensoric inspection. Usually a paint increases in viscosity during the application process and spreading the paint becomes more difficult in terms of applied force. Going at it too long can lead to transferring the paint from one end to the other, with a non-satisfying coverage incl. brush marks and bad leveling result. If drying occurs too fast touch-up with fresh paint no longer makes the previously obtained defects go away. Such an effect leads to concluding the paint job prematurely. In an ideal case, the paint job can go on until all the bars of the Leneta CU-1M chart are hidden by the wet paint (see ASTM D5150) without having defects in terms of leveling and sagging of the paint. The paints based on the binders in the examples according to the invention lead to a better hiding vs state-of-the-art commercial samples with comparable $TiO_2$ pigment volume concentrations.

The weight difference between brush and paint can before and after the paint job corresponds to the amount of paint applied to the Leneta chart. This value is then calculated to account for the total surface covered. Via the density the spread rate can be determined (see ASTM D344). Since the area to be painted is relatively large and mitigates small deviations during paint transfer and brushout, good reproducibility of the spread rate can be obtained. It should be noted that the spread rates determined here are merely a guidance, since different painters will apply the paint differently. Even correcting for this, by having different painters apply the same paints, the ranking in terms of spread rate however remains the same. Therefore, in spite of the spread in spread rate the observed differences are significant by comparing the w/b binders according to the invention vs current state-of-the-art, as demonstrated in Table 1.

Another comparison was made to paint formulated with binders from the closest state-of-the-art as mentioned in the introduction.

2. Starting Materials

Seed latex 51: Polystyrene seed latex having a solids content of 33% by weight and a volume average particle diameter of 10 to 50 nm.

Emulsifier E1: Sodium dodecyl sulfonate, 20 wt.-% aqueous solution

Emulsifier E2: Disponil FES 993, 30 wt.-% aqueous solution of the sodium salt of the sulfate of an ethoxylated $C_{12}$-$C_{14}$-alkanol having an average degree of ethoxylation of 12.

Emulsifier E3: Disponil FES 32, 31 wt.-% aqueous solution of the sodium salt of the sulfate of an ethoxylated $C_{12}$-$C_{14}$-alkanol having an average degree of ethoxylation of 4.

Emulsifier E4: Disponil FES 147, 28 wt.-% aqueous solution of the sodium salt of the sulfate of an ethoxylated $C_{12}$-$C_{14}$-alkanol having an average degree of ethoxylation of 7.

Dispersing agent: Dispex CX 4231, 30 wt.-% aqueous solution of an ammonium polyacrylate copolymer from BASF SE.

Wetting agent: EnviroGem AD 01

Defoaming agent D1: Tego Airex 901W

Defoaming agent D2: Tego Foamex 823

Biocide: Acticid MBS, 20 wt.-% aqueous solution

Brine: Ammonia solution in water (pH 8.8-9.0 conc. 25%)

HEUR thickening agent: Rheovis PU1340, 20 wt.-% aqueous solution

HMPE thickening agent: Rheovis PE1330, 30 wt.-% aqueous solution

Titanium oxide: Tiona 595 (density 4.1)

Ethyldiglycol (EDG)

Propylenglycol (PG)

Biocide 1: Biocide composition containing a mixture of 1,2-benzisothiazolin-3-one (5.0%) and 2-methyl-4-isothiazolin-3-one (2.5%)—Acticid MBS 2550 of Thor Specialties, Inc.

Ureido methacrylate: 25% solution of 2-(imidazolin-2-on-1-yl)ethylmethacrylate in methyl methacrylate.

If not stated otherwise, the water that was used was deionized water.

3. Preparations of Polymer Dispersions

Example 1

In a polymerization vessel equipped with metering devices and temperature control, 68.1 g of deionized water and 23.0 g of the seed latex 51 were introduced at room temperature (20 to 25° C.) under a nitrogen atmosphere. The mixture was heated to 85° C. under stirring. Upon reaching this temperature, 0.57 g of sodium peroxodisulfate dissolved in 7.6 g of deionized water were added in 5 minutes. The mixture was stirred for further 5 minutes.

Afterwards, the metering of feed 1 and feed 3 was started simultaneously. Regarding feed 1, 2 wt.-% of feed 1 were added within 22 minutes and the remaining 98 wt.-% of feed 1 were added within 158 minutes. In parallel, feed 3 was added within 240 min with constant feed rate, whereas the feeding was paused after 180 min for 10 minutes. 30 min after the start of Feed 1, Feed 1a was metered within 1 minute.

After the addition of feed 1, the monomer container was flushed with 46.4 g of deionized water. 10 minutes later, the metering of feed 2 was started and feed 2 was added within 60 minutes with constant feed rate.

| Feed 1 (emulsion) | |
|---|---|
| 387.2 g | water |
| 128.3 g | Emulsifier E1 |
| 15.2 g | aqueous solution comprising 50 wt.-% of acrylamide |
| 20.9 g | acrylic acid |
| 57.0 g | ureido methacrylate |
| 285.0 g | n-butyl acrylate |
| 342.0 g | 2-ethylhexyl acrylate |
| 712.5 g | methyl methacrylate |

| Feed 2 (emulsion) | |
|---|---|
| 131.9 g | water |
| 42.8 g | Emulsifier E1 |
| 7.6 g | acrylic acid |
| 19.0 g | ureido methacrylate |
| 47.5 g | n-butyl acrylate |
| 57.0 g | 2-ethylhexyl acrylate |
| 343.9 g | methyl methacrylate |

| Feed 3 (homogeneous solution) | |
|---|---|
| 143.9 g | water |
| 10.8 g | sodium persulfate |

| Feed 1a (homogeneous solution) | |
|---|---|
| 8.9 g | water |
| 9.5 g | Emulsifier E1 |

| Feed 4 (homogeneous solution) | |
|---|---|
| 22.6 g | water |
| 11.6 g | aqueous solution comprising 25 wt.-% of ammonia |

After the addition of feed 2 and feed 3, the monomer container was flushed with 46.4 g water. The mixture was further reacted for 15 minutes at 85° C.

Afterwards, feed 4 was metered within 15 minutes. The mixture was further stirred for 90 min at 85° C. During that time, 162.3 g water was added. The obtained aqueous polymer dispersion was cooled to room temperature and filtered with a 125 μm filter.

Yield: 3219.2 g of the corresponding aqueous dispersion
Solids content: 59.9 wt.-%
pH: 6.9

The water diluted aqueous polymer dispersion was characterized by analytical ultracentrifugation (AUC):
Average particle size diameter: 302 nm,
Bimodal size distribution with
33 wt.-% of small particles with a peak maximum of 92 nm,
67 wt.-% of large particles with a peak maximum of 316 nm.

An intermediate process sample was taken just before the start of metering Feed 2 and characterized by AUC:
average particle size diameter: 269 nm,
bimodal size distribution,
33 wt.-% of small particles with a peak maximum of 78 nm,
67 wt.-% of large particles with a peak maximum of 278 nm.

The final polymer dispersion had the following theoretical glass transition temperatures: Tg(A)=16° C.; Tg(B)=55° C.

The viscosity determined according to Brookfield (spindle 5, 100 rpm, room temperature) was 260 mPa·s.

Comparative Example 1

In a polymerization vessel equipped with metering devices and temperature control, 85.7 g of water and 17.0 g of the seed latex S1 were introduced at room temperature (20 to 25° C.) under a nitrogen atmosphere. The mixture was heated to 85° C. under stirring. Upon reaching this temperature, 0.84 g of sodium peroxodisulfate dissolved in 11.2 g of deionized water were added in 5 minutes. The mixture was stirred for further 5 minutes.

Afterwards, the metering of feed 1 and feed 3 was started simultaneously. Regarding feed 1, 1.5 wt.-% of feed 1 were added within 22 minutes and the remaining 98.5 wt.-% of feed 1 were added within 158 minutes. In parallel, feed 3 was added within 240 min with constant feed rate, whereas the feeding was paused after 180 min for 10 minutes. 30 min after the start of Feed 1, feed 1a was metered within 1 minute.

After the addition of Feed 1, the monomer container was flushed with 34.2 g of deionized water.

| Feed 1 (emulsion) | |
|---|---|
| 381.1 g | water |
| 126.0 g | Emulsifier E1 |
| 11.2 g | aqueous solution comprising 50 wt.-% of acrylamide |
| 21.0 g | acrylic acid |
| 56.0 g | ureido methacrylate |
| 280.0 g | n-butyl acrylate |
| 336.0 g | 2-ethylhexylacrylat |
| 701.4 g | methyl methacrylate |

| Feed 2 (homogeneous solution) | |
|---|---|
| 100.4 g | water |
| 7.6 g | sodium persulfate |

| Feed 1a (homogeneous solution) | |
|---|---|
| 50.7 g | water |
| 7.0 g | Emulsifier E1 |

| Feed 3 (homogeneous solution) | |
|---|---|
| 16.6 g | water |
| 8.6 g | aqueous solution comprising 25 wt.-% of ammonia |

After the addition of feed 1 and feed 2, the mixture was further reacted for 15 minutes at 85° C.

Afterwards, feed 3 was metered within 15 minutes. The mixture was further stirred for 90 min at 85° C. During that time, 119.6 g water was added. The obtained aqueous polymer dispersion was cooled to room temperature and filtered with a 125 μm filter.

Yield: 2372.1 g of the corresponding aqueous dispersion

Solids content: 59.9 wt.-% pH: 7.0

The water diluted aqueous polymer dispersion was characterized by (AUC):

average particle size diameter: 287 nm, bimodal size distribution, 33 wt.-% of small particles with a peak maximum of 87 nm, 67 wt.-% of large particles with a peak maximum of 302 nm.

The final polymer dispersion had the following theoretical glass transition temperature: Tg=16° C.

The viscosity determined according to Brookfield (spindle 5, 100 rpm, room temperature) was 280 mPa·s.

Example 2

In a polymerization vessel equipped with metering devices and temperature control, 68.1 g of deionized water and 23.0 g of the seed latex S1 were introduced at room temperature (20 to 25° C.) under a nitrogen atmosphere. The mixture was heated to 85° C. under stirring. Upon reaching this temperature, 0.57 g of sodium persulfate dissolved in 7.6 g of deionized water were added in 5 minutes. The mixture was stirred for further 5 minutes.

Afterwards, the metering of feed 1 and feed 3 was started simultaneously. Regarding feed 1, 2 wt.-% of feed 1 were added within 22 minutes and the remaining 98 wt.-% of feed 1 were added within 158 minutes. In parallel, feed 3 was added within 240 min with constant feed rate, whereas the feeding was paused after 180 min for 10 minutes. 30 min after the start of feed 1, feed 1a was metered within 1 minute.

After the addition of feed 1, the monomer container was flushed with 46.4 g of deionized water. 10 minutes later, the metering of feed 2 was started and feed 2 was added within 60 minutes with constant feed rate.

| Feed 1 (emulsion) | |
|---|---|
| 387.2 g | water |
| 128.3 g | Emulsifier E1 |
| 15.2 g | aqueous solution comprising 50 wt.-% of acrylamide |
| 14.3 g | acrylic acid |
| 57.0 g | ureido methacrylate |
| 285.0 g | n-butyl acrylate |
| 342.0 g | 2-ethyl hexylacrylat |
| 719.2 g | methyl methacrylat |

| Feed 2 (Emulsion) | |
|---|---|
| 131.9 g | water |
| 42.8 g | Emulsifier E1 |
| 14.2 g | acrylic acid |
| 19.0 g | ureido methacrylate |
| 47.5 g | n-butyl acrylate |
| 57.0 g | 2-ethylhexylacrylat |
| 337.3 g | methyl methacrylat |

| Feed 3 (homogeneous solution) | |
|---|---|
| 143.9 g | water |
| 10.8 g | sodium persulfate |

| Feed 1a (homogeneous solution) | |
|---|---|
| 68.9 g | water |
| 9.5 g | Emulsifier E1 |

| Feed 4 (homogeneous solution) | |
|---|---|
| 22.6 g | water |
| 11.6 g | aqueous solution comprising 25 wt.-% of ammonia |

After the addition of feed 2 and feed 3, the monomer container was flushed with 46.4 g water. The mixture was further reacted for 15 minutes at 85° C.

Afterwards, Feed 4 was metered within 15 minutes. The mixture was further stirred for 90 min at 85° C. During that time, 162.3 g water was added. The obtained aqueous polymer dispersion was cooled to room temperature and filtered with a 125 μm filter.

Yield: 3219.6 g of the corresponding aqueous dispersion

Solids content: 60.1 wt.-% pH: 6.8

The water diluted aqueous polymer dispersion was characterized by AUC:

average particle size diameter: 297 nm, bimodal size distribution 33 wt.-% of small particles with a peak maximum of 90 nm, 67 wt.-% of large particles with a peak maximum of 310 nm.

A process sample was taken just before the start of metering feed 2 and characterized by AUC:

average particle size diameter: 262 nm, bimodal size distribution, 33 wt.-% of small particles with a peak maximum of 76 nm, 67 wt.-% of large particles with a peak maximum of 273 nm.

The final polymer dispersion had the following theoretical glass transition temperatures: Tg(A)=16° C.; Tg(B)=55° C.

The viscosity determined according to Brookfield (spindle 5, 100 rpm, room temperature) was 368 mPa·s.

Example 3

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.14 g of sodium persulfate dissolved in 15.1 g of deionized water was added in 5 minutes. The mixture was stirred for another 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 43 min after the start of Feed 1, Feed 1a was metered within 12 minutes.

After the addition of Feed 1, the monomer container was flushed with 34.6 g of deionized water. 10 minutes later, the metering of feed 2 was started and feed 2 was added within 60 minutes with constant feed rate.

| Feed 1 (emulsion) | |
| --- | --- |
| 405.5 g | water |
| 114.0 g | Emulsifier E2 |
| 15.2 g | aqueous solution comprising 50 wt.-% of acrylamide |
| 20.9 g | acrylic acid |
| 57.0 g | ureido methacrylate |
| 285.0 g | n-butyl acrylate |
| 342.0 g | 2-ethylhexylacrylat |
| 712.5 g | methyl methacrylat |

| Feed 2 (emulsion) | |
| --- | --- |
| 137.6 g | water |
| 38.0 g | Emulsifier E2 |
| 7.6 g | acrylic acid |
| 19.0 g | ureido methacrylate |
| 304.0 g | n-butyl methacrylat |
| 144.4 g | methyl methacrylat |

| Feed 3 (homogeneous solution) | |
| --- | --- |
| 85.9 g | water |
| 6.5 g | sodium persulfate |

| Feed 1a (homogeneous solution) | |
| --- | --- |
| 21.6 g | water |
| 9.5 g | Emulsifier E1 |

| Feed 4 (homogeneous solution) | |
| --- | --- |
| 9.1 g | aqueous solution comprising 25 wt.-% of ammonia |

After the addition of feed 2 and feed 3, the monomer container was flushed with 34.6 g water. The mixture was further reacted for 15 minutes at 85° C.

Afterwards, feed 4 was metered within 10 minutes. The mixture was further stirred for 90 min at 85° C. During that time, 122.4 g water and 4.6 g of a 25 wt.-% aqueous solution of ammonia were added. The obtained aqueous polymer dispersion was cooled to room temperature and filtered with a 125 μm filter.

Yield: 3197.6 g of the corresponding aqueous dispersion

Solids content: 61.1 wt.-% pH: 8.0

The water diluted aqueous polymer dispersion was characterized by AUC:

average particle size diameter: 323 nm, bimodal size distribution, 18 wt.-% of small particles with a peak maximum of 60 nm, 82 wt.-% of large particles with a peak maximum of 320 nm.

The final polymer dispersion had the following theoretical glass transition temperatures: Tg(A)=16° C.; Tg(B)=55° C.

The viscosity determined according to Brookfield (spindle 5, 100 rpm, room temperature) was 320 mPa s.

Example 4

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.14 g of sodium persulfate dissolved in 15.1 g of deionized water was added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 43 min after the start of feed 1, feed 1a was metered within 12 minutes.

After the addition of feed 1, the monomer container was flushed with 34.6 g of deionized water. 10 minutes later, the metering of feed 2 was started and feed 2 was added within 60 minutes with constant feed rate.

| Feed 1 (Emulsion) | |
| --- | --- |
| 405.4 g | water |
| 114.0 g | Emulsifier E2 |
| 15.2 g | aqueous solution comprising 50 wt.-% of acrylamide |
| 20.9 g | acrylic acid |
| 57.0 g | ureido methacrylate |
| 285.0 g | n-butyl acrylate |
| 342.0 g | 2-ethylhexyl acrylat |
| 712.5 g | methyl methacrylate |

| Feed 2 (Emulsion) | |
| --- | --- |
| 137.6 g | water |
| 38.0 g | Emulsifier E2 |
| 7.6 g | acrylic acid |
| 19.0 g | ureido methacrylate |
| 47.5 g | n-butyl acrylate |
| 57.0 g | 2-ethylhexyl acrylat |
| 343.9 g | styrene |

| Feed 3 (homogeneous solution) | |
|---|---|
| 85.9 g | water |
| 6.5 g | sodium persulfate |

| Feed 1a (homogeneous solution) | |
|---|---|
| 21.6 g | water |
| 9.5 g | Emulsifier E1 |

| Feed 4 (homogeneous solution) | |
|---|---|
| 9.12 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 122.4 g water and 4.6 g of a 25 wt.-% aqueous solution of ammonia were added. The obtained aqueous polymer dispersion was cooled to room temperature and filtered with a 125 μm filter.

Yield: 3197.6 g of the corresponding aqueous dispersion
Solids content: 61.3 wt.-%
pH: 7.8
The water diluted aqueous polymer dispersion was characterized by AUC:
  average particle size diameter: 325 nm, bimodal size distribution,
  22 wt.-% of small particles with a peak maximum of 60 nm,
  78 wt.-% of large particles with a peak maximum of 323 nm.

The final polymer dispersion had the following theoretical glass transition temperatures: Tg(A)=16° C.; Tg(B)=55° C.

The viscosity determined according to Brookfield (spindle 5, 100 rpm, room temperature) was 260 mPa s.

Example 5

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 5.7 g of sodium persulfate dissolved in 75.8 g of deionized water were added in 5 minutes. The mixture was stirred for further 5 minutes.

Afterwards, the metering of feed 1 and feed 3 was started simultaneously. Regarding feed 1, 2 wt.-% of feed 1 were added within 22 minutes and the remaining 98 wt.-% of feed 1 were added within 158 minutes. In parallel, Feed 3 was added within 240 min with constant feed rate, whereas the feeding was paused after 180 min for 10 minutes. 30 min after the start of Feed 1, Feed 1a was metered within 1 minute.

After the addition of Feed 1, the monomer container was flushed with 34.6 g of deionized water. 10 minutes later, the metering of feed 2 was started and feed 2 was added within 60 minutes with constant feed rate.

| Feed 1 (Emulsion) | |
|---|---|
| 414.5 g | water |
| 96.0 g | Emulsifier E2 |
| 15.2 g | aqueous solution comprising 50 wt.-% of acrylamide |
| 20.9 g | acrylic acid |
| 57.0 g | ureido methacrylate |
| 285.0 g | n-butyl acrylate |
| 342.0 g | 2-ethylhexylacrylat |
| 712.5 g | methyl methacrylat |

| Feed 2 (Emulsion) | |
|---|---|
| 140.6 g | water |
| 32.0 g | Emulsifier E2 |
| 7.6 g | acrylic acid |
| 19.0 g | ureido methacrylate |
| 47.5 g | n-butyl acrylate |
| 57.0 g | 2-ethylhexyl acrylate |
| 343.9 g | methyl methacrylate |

| Feed 3 (homogeneous solution) | |
|---|---|
| 75.8 g | water |
| 5.7 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water und |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3226.3 g of the corresponding aqueous dispersion
Solids content: 60.2 wt.-%
pH: 8.1
The water diluted aqueous polymer dispersion was characterized by AUC:
  average particle size diameter: 330 nm,
  bimodal size distribution,
  12 wt.-% of small particles with a peak maximum of 81 nm,
  88 wt.-% of large particles with a peak maximum of 328 nm.

The final polymer dispersion had the following theoretical glass transition temperatures: Tg(A)=16° C.; Tg(B)=55° C.

The viscosity determined according to Brookfield (spindle 5, 100 rpm, room temperature) was 808 mPa·s.

Example 6

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 5.7 g of sodium persulfate dissolved in 75.8 g of deionized water were added in 5 minutes. The mixture was stirred for further 5 minutes.

Afterwards, the metering of feed 1 and feed 3 was started simultaneously. Regarding feed 1, 2 wt.-% of feed 1 were added within 22 minutes and the remaining 98 wt.-% of feed 1 were added within 158 minutes. In parallel, Feed 3 was added within 240 min with constant feed rate, whereas the feeding was paused after 180 min for 10 minutes. 30 min after the start of Feed 1, Feed 1a was metered within 1 minute.

After the addition of Feed 1, the monomer container was flushed with 34.6 g of deionized water. 10 minutes later, the metering of feed 2 was started and feed 2 was added within 60 minutes with constant feed rate.

| Feed 1 (Emulsion) | |
|---|---|
| 414.5 g | water |
| 96.0 g | Emulsifier E2 |
| 15.2 g | aqueous solution comprising 50 wt.-% of acrylamide |
| 20.9 g | acrylic acid |
| 57.0 g | ureido methacrylate |
| 342.0 g | n-butyl acrylate |
| 342.0 g | 2-ethylhexyl acrylate |
| 655.5 g | methyl methacrylate |

| Feed 2 (Emulsion) | |
|---|---|
| 140.6 g | water |
| 32.0 g | Emulsifier E2 |
| 7.6 g | acrylic acid |
| 19.0 g | ureido methacrylate |
| 57.0 g | 2-ethylhexyl acrylate |
| 391.4 g | methyl methacrylate |

| Feed 3 (homogeneous solution) | |
|---|---|
| 75.8 g | water |
| 5.7 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 µm filter.

Yield: 3226.3 g of the corresponding aqueous dispersion
Solids content: 60.1 wt.-%
pH: 8.0

The water diluted aqueous polymer dispersion was characterized by AUC:

average particle size diameter: 303 nm,
bimodal size distribution,
32 wt.-% of small particles with a peak maximum 86 nm,
68 wt.-% of large particles with a peak maximum 308 nm.

The final polymer dispersion had the following theoretical glass transition temperatures: Tg(A)=10° C.; Tg(B)=74° C.

The viscosity determined according to Brookfield (spindle 5, 100 rpm, room temperature) was 488 mPa·s.

Example 7

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, feed 3 was added within 240 min with constant feed rate, whereas the feeding was paused after 180 min for 10 minutes. 49 min after the start of feed 1, feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (Emulsion) | |
|---|---|
| 414.5 g | water |
| 96.0 g | Emulsifier E2 |
| 15.2 g | aqueous solution comprising 50 wt.-% of acrylamide |
| 20.9 g | acrylic acid |
| 57.0 g | ureido methacrylate |
| 342.0 g | n-butyl acrylate |
| 342.0 g | 2-ethylhexyl acrylate |
| 655.5 g | methyl methacrylate |

| Feed 2 (Emulsion) | |
|---|---|
| 140.6 g | water |
| 32.0 g | Emulsifier E2 |
| 7.6 g | acrylic acid |
| 19.0 g | ureido methacrylate |
| 57.0 g | 2-ethylhexyl acrylate |
| 391.4 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 52.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3220.0 g of the corresponding aqueous dispersion
Solids content: 60.0 wt.-%
pH: 8.4

The water diluted aqueous polymer dispersion was characterized by AUC:
average particle size diameter: 306 nm,
bimodal size distribution,
22 wt.-% of small particles with average diameter 80 nm,
78 wt.-% of large particles with average diameter 310 nm.

The final polymer dispersion had the following theoretical glass transition temperatures: Tg(A)=10° C.; Tg(B)=74° C.

The viscosity determined according to Brookfield (spindle 5, 100 rpm, room temperature) was 872 mPa·s.

Example 8

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 144 minutes with constant feed rate. In parallel, Feed 3 was added within 240 min with constant feed rate, whereas the feeding was paused after 204 min for 10 minutes. 49 min after the start of Feed 1, Feed 1a was metered within 1 minute.

After the addition of Feed 1, the monomer container was flushed with 34.6 g of deionized water. 10 minutes later, the metering of feed 2 was started and feed 2 was added within 36 minutes with constant feed rate.

| Feed 1 (Emulsion) | |
|---|---|
| 505.4 g | water |
| 121.6 g | Emulsifier E2 |
| 15.2 g | aqueous solution comprising 50 wt.-% of acrylamide |
| 23.8 g | acrylic acid |
| 64.6 g | ureido methacrylate |

-continued

| Feed 1 (Emulsion) | |
|---|---|
| 452.2 g | n-butyl acrylate |
| 387.6 g | 2-ethylhexyl acrylate |
| 679.3 g | methyl methacrylate |

| Feed 2 (Emulsion) | |
|---|---|
| 89.4 g | water |
| 22.8 g | Emulsifier E2 |
| 4.6 g | acrylic acid |
| 11.4 g | ureido methacrylate |
| 34.2 g | 2-ethylhexyl acrylate |
| 234.8 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3228.1 g of the corresponding aqueous dispersion
Solids content: 60.1 wt.-%
pH: 8.3

The water diluted aqueous polymer dispersion was characterized by AUC:
average particle size diameter: 281 nm,
bimodal size distribution,
30 wt.-% of small particles with average diameter 80 nm,
70 wt.-% of large particles with average diameter 293 nm.

The final polymer dispersion had the following theoretical glass transition temperatures: Tg(A)=5° C.; Tg(B)=74° C.

The viscosity determined according to Brookfield (spindle 5, 100 rpm, room temperature) was 1430 mPa·s.

Example 9

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 96 minutes with constant feed rate. In parallel, Feed 3 was added within 240 min with constant feed rate, whereas the feeding was paused after 156 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 84 minutes with constant feed rate.

| Feed 1 (Emulsion) | |
|---|---|
| 376.8 g | water |
| 106.4 g | Emulsifier E2 |
| 15.2 g | aqueous solution comprising 50 wt.-% of acrylamide |
| 18.1 g | acrylic acid |
| 49.4 g | ureido methacrylate |
| 345.8 g | n-butyl acrylate |
| 296.4 g | 2-ethylhexyl acrylat |
| 517.8 g | methyl methacrylat |

| Feed 2 (Emulsion) | |
|---|---|
| 214.3 g | water |
| 45.6 g | Emulsifier E2 |
| 10.6 g | acrylic acid |
| 26.6 g | ureido methacrylate |
| 79.8 g | 2-ethylhexyl acrylate |
| 548.0 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 µm filter.
Yield: 3232.0 g of the corresponding aqueous dispersion
Solids content: 60.1 wt.-%
pH: 8.4
The water diluted aqueous polymer dispersion was characterized by AUC:
average particle size diameter: 275 nm,
bimodal size distribution,
30 wt.-% of small particles with a peak maximum 77 nm,
70 wt.-% of large particles with a peak maximum 289 nm.

The final polymer dispersion had the following theoretical glass transition temperatures: Tg(A)=5° C.; Tg(B)=74° C.

The viscosity determined according to Brookfield (spindle 5, 100 rpm, room temperature) was 1160 mPa·s.

Example 10

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
|---|---|
| 457.4 g | water |
| 84.6 g | Emulsifier E3 |
| 15.2 g | aqueous solution comprising 50 wt.-% of acrylamide |
| 20.9 g | acrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
|---|---|
| 155.1 g | water |
| 28.2 g | Emulsifier E3 |
| 7.6 g | acrylic acid |
| 19.0 g | ureido methacrylate |
| 57.0 g | 2-ethylhexyl acrylate |
| 391.4 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 µm filter.

Yield: 3201.0 g of the corresponding aqueous dispersion

Solids content: 60.2 wt.-% pH: 8.3

The water diluted aqueous polymer dispersion was characterized by AUC:

average particle size diameter: 263 nm, bimodal size distribution, 37 wt.-% of small particles with a peak maximum 78 nm, 63 wt.-% of large particles with a peak maximum 276 nm.

The final polymer dispersion had the following theoretical glass transition temperatures: Tg(A)=5° C.; Tg(B)=74° C.

The viscosity determined according to Brookfield (spindle 5, 100 rpm, room temperature) was 1390 mPa·s.

Example 11

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
|---|---|
| 460.0 g | water |
| 69.7 g | emulsifier E4 |
| 15.2 g | aqueous solution comprising 50 wt.-% of acrylamide |
| 20.9 g | acrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
|---|---|
| 156.0 g | water |
| 23.2 g | Emulsifier E4 |
| 7.6 g | acrylic acid |
| 19.0 g | ureido methacrylate |
| 57.0 g | 2-ethylhexyl acrylate |
| 391.4 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 µm filter.

Yield: 3198.0 g of the corresponding aqueous dispersion

Solids content: 60.1 wt.-% pH: 8.3

The water diluted aqueous polymer dispersion was characterized by AUC:

average particle size diameter: 291 nm, bimodal size distribution, 29 wt.-% of small particles with a peak maximum 89 nm, 71 wt.-% of large particles with a peak maximum 301 nm.

The final polymer dispersion had the following theoretical glass transition temperatures: Tg(A)=5° C.; Tg(B)=74° C.

The viscosity determined according to Brookfield (spindle 5, 100 rpm, room temperature) was 1260 mPa·s.

Example 12

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
| --- | --- |
| 441.3 g | water |
| 114.0 g | Emulsifier E2 |
| 15.2 g | aqueous solution comprising 50 wt.-% of acrylamide |
| 20.9 g | acrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
| --- | --- |
| 149.8 g | water |
| 38.0 g | Emulsifier E2 |
| 7.6 g | acrylic acid |
| 19.0 g | ureido methacrylate |
| 57.0 g | 2-ethylhexyl acrylate |
| 391.4 g | methyl methacrylate |

| Feed 3 (homogeneous solution) | |
| --- | --- |
| 85.9 g | water |
| 6.5 g | sodium persulfate |

| Feed 1a (homogeneous solution) | |
| --- | --- |
| 37.2 g | water |
| 7.7 g | Emulsifier E3 |

| Feed 4 (homogeneous solution) | |
| --- | --- |
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3233.0 g of the corresponding aqueous dispersion
Solids content: 60.1 wt.-%
pH: 8.3

The water diluted aqueous polymer dispersion was characterized by AUC:
average particle size diameter: 276 nm,
bimodal size distribution,
40 wt.-% of small particles with a peak maximum 71 nm,
60 wt.-% of large particles with a peak maximum 290 nm.

The final polymer dispersion had the following theoretical glass transition temperatures: Tg(A)=5° C.; Tg(B)=74° C.

The viscosity determined according to Brookfield (spindle 5, 100 rpm, room temperature) was 1360 mPa·s.

Example 13

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
| --- | --- |
| 448.9 g | water |
| 114.0 g | Emulsifier E2 |
| 28.5 g | methacrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
| --- | --- |
| 149.8 g | water |
| 38.0 g | Emulsifier E2 |
| 9.5 g | methacrylic acid |
| 19.0 g | ureido methacrylate |
| 57.0 g | 2-ethylhexyl acrylate |
| 389.5 g | methyl methacrylate |

| Feed 3 (homogeneous solution) | |
| --- | --- |
| 85.9 g | water |
| 6.5 g | sodium persulfate |

| Feed 1a (homogeneous solution) | |
| --- | --- |
| 34.6 g | water |
| 9.5 g | Emulsifier E1 |

| Feed 4 (homogeneous solution) | |
| --- | --- |
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3232.0 g of the corresponding aqueous dispersion

Solids content: 60.1 wt.-% pH: 8.8

The water diluted aqueous polymer dispersion was characterized by AUC:

average particle size diameter: 314 nm, bimodal size distribution, 22 wt.-% of small particles with a peak maximum 65 nm, 78 wt.-% of large particles with a peak maximum 310 nm.

The final polymer dispersion had the following theoretical glass transition temperatures: Tg(A)=5° C.; Tg(B)=75° C.

The viscosity determined according to Brookfield (spindle 5, 100 rpm, room temperature) was 184 mPa·s.

Example 14

In a polymerization vessel equipped with metering devices and temperature control, 226.9 g of deionized water and 23.0 g of the seed latex 51 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 49 min after the start of Feed 1, Feed 1a was metered within 1 minute.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
|---|---|
| 448.9 g | water |
| 114.0 g | Emulsifier E2 |
| 19.0 g | methacrylic acid |
| 57.0 g | ureido methacrylate |
| 399.0 g | n-butyl acrylate |
| 342.0 g | 2-ethylhexyl acrylate |
| 608.0 g | methyl methacrylate |

| Feed 2 (emulsion) | |
|---|---|
| 149.8 g | water |
| 38.0 g | Emulsifier E2 |
| 19.0 g | methacrylic acid |
| 19.0 g | ureido methacrylate |
| 57.0 g | 2-ethylhexyl acrylate |
| 380.0 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 34.6 g | water |
| 9.5 g | Emulsifier E1 |

| Feed 4 (homogeneous solution) | |
|---|---|
| 4.7 g | water |
| 18.2 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 86.5 g water were added. The obtained aqueous polymer dispersion was cooled to room temperature and filtered with a 125 μm filter.

Yield: 3232.0 g of the corresponding aqueous dispersion

Solids content: 60.0 wt.-% pH: 7.7

The water diluted aqueous polymer dispersion was characterized by AUC:

average particle size diameter: 310 nm, bimodal size distribution, 22 wt.-% of small particles with a peak maximum 62 nm, 78 wt.-% of large particles with a peak maximum 310 nm.

The final polymer dispersion had the following theoretical glass transition temperatures: Tg(A)=5° C.; Tg(B)=75° C.

The viscosity determined according to Brookfield (spindle 5, 100 rpm, room temperature) was 1012 mPa·s.

Comparative Example 2

A polymer dispersion was prepared by the protocol of example 5 of WO 01/38412.

An aqueous polymer dispersion having a solids content of 57.9 wt.-% and a pH of 8.3 was obtained. The viscosity of the polymer dispersion according to Brookfield was 104 mPa s (spindle 5, 100 rpm, room temperature).

The water diluted aqueous polymer dispersion was characterized by AUC:

average particle size diameter: 265 nm.

The polymer dispersion had a multimodal size distribution with poorly separated peaks of the different particle generations and the following characteristic values:

approx. 15 wt.-% of small particles having an average diameter of 60 nm, approx. 15 wt.-% of 2" generation of particles having a diameter (peak maximum) of about 115 nm, approx. 60 wt.-% of large particles having an average diameter of 280 nm.

Comparative Example 3

A polymer dispersion was prepared by analogy to the protocol of example 5 of WO 01/38412, replacing styrene by the same amount of methyl methacrylate.

An aqueous polymer dispersion having a solids content of 58.6 wt.-% and a pH of 7.5 was obtained. The viscosity of the polymer dispersion according to Brookfield was 92 mPa s (spindle 5, 100 rpm, room temperature).

The water diluted aqueous polymer dispersion was characterized by AUC:

average particle size diameter: 414 nm.

The polymer dispersion had a multimodal size distribution with poorly separated peaks of 2 main generations of particles and the following characteristic values:

approx. 45 wt.-% of small particles with a peak maximum of 380 nm, and approx. 40 wt.-% of large particles with a peak maximum of 475 nm.

Example 15

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 38 min after the start of Feed 1, Feed 1a was metered within 12 minutes.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
|---|---|
| 413.1 g | water |
| 114.0 g | Emulsifier E2 |
| 28.5 g | methacrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
|---|---|
| 137.6 g | water |
| 38.0 g | Emulsifier E2 |
| 9.5 g | methacrylic acid |
| 19.0 g | ureido methacrylate |
| 57.0 g | 2-ethylhexyl acrylate |
| 389.5 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 33.0 g | water |
| 11.9 g | Emulsifier E1 |

| Feed 4 (homogeneous solution) | |
|---|---|
| 9.5 g | water |
| 9.1 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 15 minutes. The mixture was further stirred for 90 min at 85° C. During that time, 131.9 g water were added. To the obtained aqueous polymer dispersion 4.6 g of a 25 wt.-% aqueous solution of ammonia was added, it was cooled to room temperature and filtered with a 125 μm filter.

Yield: 3230.3 g of the corresponding aqueous dispersion

Solids content: 60.3 wt.-% pH: 8.4

The water diluted aqueous polymer dispersion was characterized by AUC:

average particle size diameter: 315 nm, bimodal size distribution, 20 wt.-% of small particles with a peak maximum of 69 nm, 80 wt.-% of large particles with a peak maximum of 316 nm.

The final polymer dispersion had the following theoretical glass transition temperatures: Tg(A)=5° C.; Tg(B)=75° C.

The viscosity determined according to Brookfield (spindle 5, 100 rpm, room temperature) was 160 mPa s.

Comparative Example 4 (without Emulsifier Shot)

This example was carried out like example 15, however the composition of feed 1a did not contain the emulsifier E1, but 40.9 g water.

Yield: 3226.4 g of the corresponding aqueous dispersion

Solids content: 60.5 wt.-% pH: 8.5

The water diluted aqueous polymer dispersion was characterized by AUC: Monomodal particle size distribution with an average diameter of 349 nm.

The final polymer dispersion had the following theoretical glass transition temperatures: Tg(A)=5° C.; Tg(B)=75° C.

The viscosity determined according to Brookfield (spindle 5, 100 rpm, room temperature) was 584 mPa·s.

After about one week a sediment was formed in the dispersion.

Example 16

In a polymerization vessel equipped with metering devices and temperature control, 226.9 g of deionized water and 23.0 g of the seed latex S1 were introduced at room temperature (20 to 25° C.) under a nitrogen atmosphere. The mixture was heated to 85° C. under stirring. Upon reaching this temperature, 1.1 g of sodium persulfate dissolved in 15.1 g of deionized water were added in 5 minutes. The mixture was stirred for further 5 minutes.

Afterwards, the metering of feed 1 and feed 3 was started simultaneously. Regarding feed 1, 10 wt.-% of feed 1 were added within 60 minutes with increasing feed rate and the remaining 90 wt.-% of feed 1 were added within 120 minutes with constant feed rate. In parallel, Feed 3 was added within 240 min with constant feed rate, whereas the feeding was paused after 180 min for 10 minutes. 100 min after the start of Feed 1, Feed 1a was metered within 2 minutes.

After the addition of feed 1, the monomer container was flushed with 34.6 g of deionized water. 10 minutes later, the metering of feed 2 was started and feed 2 was added within 60 minutes with constant feed rate.

| Feed 1 (emulsion) | |
|---|---|
| 413.1 g | water |
| 114.0 g | Emulsifier E2 |
| 28.5 g | methacrylic acid |
| 57.0 g | ureido methacrylate |
| 399.0 g | n-butyl acrylate |
| 342.0 g | 2-ethylhexyl acrylate |
| 598.5 g | methyl methacrylate |

| Feed 2 (emulsion) | |
|---|---|
| 137.6 g | water |
| 38.0 g | Emulsifier E2 |
| 9.5 g | methacrylic acid |
| 19.0 g | ureido methacrylate |
| 57.0 g | 2-ethylhexyl acrylate |
| 389.5 g | methyl methacrylate |

| Feed 3 (homogeneous solution) | |
|---|---|
| 85.9 g | water |
| 6.5 g | sodium persulfate |

| Feed 1a (homogeneous solution) | |
|---|---|
| 4.8 g | water |
| 138.2 g | seed dispersion S1 |

| Feed 4 (homogeneous solution) | |
|---|---|
| 9.1 g | aqueous solution comprising 25 wt.-% of ammonia |

After the addition of feed 2 and feed 3, the monomer container was flushed with 34.6 g water. The mixture was further reacted for 15 minutes at 85° C. Afterwards, feed 4 was metered within 10 minutes. The mixture was further stirred for 25 min at 85° C. During that time, 35 g water were added. Afterwards, 19 g of an aqueous solution comprising 10 wt.-% of t-butyl hydroperoxide and 19.8 g of an aqueous solution comprising 5.8 wt.-% of L(+)-ascorbic acid were fed in parallel during 60 min. Then, 4.6 g of an aqueous solution comprising 25 wt.-% of ammonia was added in 10 min. The dispersion was cooled to room temperature during which a final amount of 64.4 g water was added, and filtered with a 125 μm filter.

Yield: 3324.9 g of the corresponding aqueous dispersion
Solids content: 59.9 wt.-%
pH: 8.4

The water diluted aqueous polymer dispersion was characterized by AUC:
average particle size diameter: 329 nm,
bimodal size distribution,
24 wt.-% of small particles with a peak maximum of 59 nm,
76 wt.-% of large particles with a peak maximum of 332 nm.

The final polymer dispersion had the following theoretical glass transition temperatures: Tg(A)=5° C.; Tg(B)=75° C.

The viscosity determined according to Brookfield (spindle 5, 100 rpm, room temperature) was 160 mPa s.

4. Preparations of Waterborne Paints

A waterborne paint was prepared according to the following general recipe:

First, the following components were added to the reaction vessel and dispersed for 30 minutes at 2000 rpm using a Dissolver:

20 g water
9 g dispersing agent
1 g wetting agent
3 g defoaming agent D1
2 g biocide
2 g ammonia brine
27 g HEUR thickening agent
270 g titanium dioxide
30 g water.

Subsequently, the following components
30 g ethyldiglycol (EDG)
30 g propylenglycol (PG)
5 g defoaming agent D2
were added to the mixture and dispersed for 10 minutes at 1000 rpm.

Subsequently, the following components
537.8 g of a dispersion according to any one of the examples 1 to 14 was added to the mixture and dispersed for 10 minutes at 1000 rpm.

The composition obtained had a solids content of 61.2%.
$TiO_2$-vol.: 65.9 mL
Disp. vol.: 300.3 mL
$H_2O$ vol.: 401.8 mL
PVC ($TiO_2$) 18.0%
volume-fraction of solids: 47.7%

It will be appreciated that the higher solids content of the binder opens up new formulation space in comparison to binders of 45 to 50 wt %. A higher amount of $TiO_2$ can be added during the grinding stage whilst maintaining a constant pigment volume concentration of the final paint. Even if the water in the grind stage (20 g) would be replaced with current state-of-the-art binders of 45 to 50 wt %, a formulation space such as for the binders according to the invention would not open up. From a practical point of view, especially in light of scaling up to industrial paint manufacture with flush waters for plant hygiene and cross-contamination etc., the formulation described above may be easily implemented. The additional pigment and layer thickness will aid in achieving a satisfying hiding after a single coating step, even for color tones that may be difficult to achieve today.

TABLE 1

| | Physico-chemical and mechanical properties | | | | | | | |
|---|---|---|---|---|---|---|---|---|
| | Crack-free films (1 mm)? | König hardness of polymer dispersion (s) | König hardness of paint formulation (s) | Stormer viscosity (KU) | ICI (mPa*s) | Spread rate (g/m$^2$) | Blocking resistance | Water uptake (%) |
| Example 1 | − | 71.4 | 39.2 | 82 | 4.3 | 160 | 2 | 2.8 |
| Comp Ex. 1 | − | 67.2 | 39.2 | 82 | 4.6 | 160 | 5 | 12.6 |
| Ex. 2 | − | 71.4 | 39.2 | 90 | 6.4 | 130 | 2 | 4.3 |
| Ex. 3 | − | 65.8 | 39.2 | 83 | 4.5 | 160 | 3 | 4.1 |
| Ex. 4 | − | 75.6 | | | | | 1 | 3.1 |
| Ex. 5 | − | 72.8 | 33.6 | 84 | 5.9 | 130 | 1 | |
| Ex. 6 | − | 68.6 | 32.2 | 84 | 4.4 | 160 | 2 | |
| Ex. 7 | + | 70.0 | 30.8 | 94 | 5.3 | 140 | 2 | 9.4 |
| Ex. 8 | + | 32.2 | 19.6 | 98 | 4.2 | 150 | 4 | 20.9 |
| Ex. 9 | − | 60.2 | 36.4 | 96 | 3.5 | 150 | 1 | |
| Ex. 10 | + | 44.8 | 22.4 | 101 | 3.9 | 150 | 1 | |
| Ex. 11 | + | 43.4 | 22.4 | 111 | 3.2 | 140 | 1 | |
| Ex. 12 | + | 37.8 | 21.0 | 100 | 4.3 | 140 | 1 | |
| Ex. 13 | + | 47.6 | 26.6 | 100 | 3.3 | 140 | 1 | |
| Ex. 13-2[1)] | + | 47.6 | 25.2 | 80 | 4.2 | 160 | 2 | |
| Ex. 14 | + | 51.8 | 28.0 | 94 | 3.8 | 150 | 2 | |
| Commercial w/b[2)] | + | N/A | 26.6 | 93 | 2.3 | 90 | 2 | |
| Commercial s/b[3)] | + | N/A | 11.4 | 81 | 7.8 | 100 | 5 | |
| Comp. Ex. 2 | − | N/A | N/A | 140 | 4.1 | 140 | | |
| Comp. Ex. 3 | − | N/A | N/A | 96 | 4.0 | 120 | | |

[1)]A formulation similar to that of example 13 but using Rheovis PE 1330
[2)]commercial waterborne paint: Capacryl PU Satin Weiβ
[3)]commercial solvent-borne paint: Capalac Seidenmatt Weiβ

Comparative Example 4: The formulation could not be applied by a brush, since the brush-out process as described under Method 1.7 failed. While the paint could be transferred from the container to the substrate, upon brush-out the force required to spread the paint (also known as brush drag) reached unacceptable levels.

We claim:

1. A process for producing an aqueous polymer dispersion of polymerized ethylenically unsaturated monomers M having a polymer content of at least 55 wt.-%, based on the total weight of the aqueous polymer dispersion, and a polymodal particle size distribution of the polymer particles of the polymer dispersion,
where the aqueous polymer dispersion comprises a first population of polymer particles and a second population of polymer particles, where the weight ratio of the polymer particles of the first population to the polymer particles of the second population is at most 1:1,
where both the polymer particles of the first population and the polymer particles of the second population comprise a first polymer phase A having a glass transition temperature Tg(A) and a second polymer phase B having glass transition temperature Tg(B), where the difference Tg(B)−Tg(A) is at least 10° C.
where Tg(A) and Tg(B) are theoretical glass transition temperatures as determined by the Fox equation,
where the process comprises aqueous radical emulsion polymerization of ethylenically unsaturated monomers M in the presence of an emulsifier E, comprising the following steps:
i) aqueous radical emulsion polymerization of a first monomer composition M(1) forming either the polymer phase A or B, and subsequently
ii) aqueous radical emulsion polymerization a second monomer composition M(2) forming the other polymer phase A or B,
where at least 95% of the first monomer composition M(1) and a portion of the emulsifier E are metered during a period P(1) to the polymerization reaction under polymerization conditions, and where during the period P(1) at least one of the following measures i.1 or i.2 are taken:
i.1 during one period P(e) within said period P(1) an emulsifier E(e) is added, where the total addition rate of all emulsifiers added during that period P(e) is at least 1.2 times higher than the average rate of addition of all emulsifiers added during the period P(1), and
i.2 during one period P(s) within said period P(1), a seed latex is added;
wherein the monomers M comprise:
10 to 95 wt.-%, based on the total amount of the monomers M, of monomers forming the polymer phase having the lower glass transition temperature Tg(A) and
5 to 90 wt.-%, based on the total amount of the monomers M, of monomers forming the polymer phase having the higher glass transition temperature Tg(B); and
wherein the emulsifier E is selected from anionic emulsifiers, nonionic emulsifiers, or mixtures of non-ionic and anionic emulsifiers.

2. The process of claim 1,
where the periods P(e) and P(s) start at a point of time t(s), where at least 3% of the total amount of the monomers M have been metered to the polymerization reaction and/or where the periods P(e) and P(s) end at a point of time t(e), where at most 90% of the total amount of the monomer composition M(1) have been metered into the polymerization reaction.

3. The process as claimed in claim 1, where the duration of periods P(e) and P(s) are at most 1/5 of the duration of period P(1).

4. The process of claim 1, where during the period P(1) the rate of addition of monomers M(1) is increased at least once.

5. The process of claim 1, where the emulsifier E(e) which is added during the period P(e) comprises at least one emulsifier, which is selected from the group consisting of
the alkali and ammonium salts of $C_{10}$-$C_{20}$ alkyl sulfates,
the alkali and ammonium salts of sulfates ethoxylated $C_{10}$-$C_{20}$ alkanols having an average degree of ethoxylation of at most 7,
the alkali and ammonium salts of $C_6$-$C_{16}$ alkyl benzene sulfonates.

6. The process of claim 1, where a seed latex S is added previous to the start of period P(1).

7. The process of claim 1, wherein the glass transition temperature Tg(A) is in the range of −30 to +60° C. and the glass transition temperature Tg(B) is in the range of +30 to +160° C., provided that Tg(B)−Tg(A) is at least 10° C.

8. The process of claim 1, where the monomers of the monomer composition M(1) form the polymer phase A.

9. The process of claim 1, wherein the particle size distribution of the polymer particles has a first maximum in the range of 30 to 150 nm and a second maximum in the range of 200 to 500 nm, where the particle size and the distribution of particle size of the polymer particles is determined by analytical ultracentrifuge (AUC).

10. The process of claim 1, where the ethylenically unsaturated monomers M comprise
   a) at least one nonionic monoethylenically unsaturated monomer M1 having a solubility in deionized water of at most 60 g/L at 25° C. and 1 bar,
   b) at least one monoethylenically unsaturated monomer M2 selected from acidic monomers and their salts,
   c) optionally one or more ethylenically unsaturated monomers, which are different from the monomers M1 and M2.

11. The process of claim 10, wherein
   a) the monomers M1 are selected from the group consisting of $C_1$-$C_{20}$-alkyl esters of acrylic acid, and $C_1$-$C_{20}$-alkylesters of methacrylic acid, and mixtures thereof;
   b) the monomers M2 are selected from the group consisting of monoethylenically unsaturated monocarboxylic acids having 3 to 6 carbon atoms and monoethylenically unsaturated dicarboxylic acids having 4 to 6 carbon atoms,
   c) wherein the monomers M further comprise at least one nonionic monoethylenically unsaturated monomer M3 having a functional group selected from a carboxamide group, a urea group and a keto group.

* * * * *